United States Patent [19]

Singhi

[11] Patent Number: 4,677,541
[45] Date of Patent: Jun. 30, 1987

[54] PROGRAMMABLE CLOCK
[75] Inventor: Dilip T. Singhi, Skokie, Ill.
[73] Assignee: Rauland-Borg Corporation, Chicago, Ill.
[21] Appl. No.: 654,202
[22] Filed: Sep. 24, 1984
[51] Int. Cl.⁴ .......................................... G06F 15/46
[52] U.S. Cl. .................................. 364/145; 364/569; 364/900; 364/492
[58] Field of Search ........................... 364/143–147, 364/492, 493, 569, 200 MS File, 900 MS File; 307/38–41, 141, 141.4; 340/309.15, 309.3, 309.4

[56] References Cited

U.S. PATENT DOCUMENTS

| | | | |
|---|---|---|---|
| 2,899,500 | 8/1959 | Bray et al. | 340/309.15 |
| 2,944,245 | 7/1960 | Lynnworth et al. | 340/309.15 |
| 2,987,703 | 6/1961 | Hauri | 340/365 R |
| 3,058,095 | 10/1962 | Reynolds, Jr. | 340/365 R |
| 3,229,278 | 1/1966 | Hanson et al. | 340/347 |
| 3,408,629 | 10/1968 | Haselwood | 364/200 |
| 3,434,115 | 3/1969 | Chomicki | 364/200 |
| 3,440,434 | 4/1969 | Yates et al. | 307/41 |
| 3,585,375 | 6/1971 | Hedrick | 340/309.15 |
| 3,603,961 | 9/1971 | Duris et al. | 340/309.4 |
| 3,636,549 | 1/1972 | Berman et al. | 340/309.15 |
| 3,643,420 | 2/1972 | Haydon | 368/155 |
| 3,651,471 | 3/1972 | Haselwood et al. | 364/200 |
| 3,677,335 | 7/1972 | Weatherston | 307/39 |
| 3,684,358 | 8/1972 | Boudouris et al. | 340/309.3 |
| 3,685,278 | 8/1972 | Haydon | 368/155 |
| 3,686,633 | 8/1972 | Carmody | 340/309.4 |
| 3,767,901 | 10/1973 | Black et al. | 364/200 |
| 3,774,056 | 11/1973 | Sample et al. | 307/141 |
| 3,790,815 | 2/1974 | Karklys | 307/141 |
| 3,819,906 | 6/1974 | Gould, Jr. | 219/506 |
| 3,827,030 | 7/1974 | Seipp | 364/200 |
| 3,834,153 | 9/1974 | Yoda et al. | 368/155 |
| 3,859,653 | 1/1975 | Tillman et al. | 340/323 B |
| 3,878,983 | 4/1975 | Hamill, III et al. | 364/474 |
| 3,886,539 | 5/1975 | Gould, Jr. | 219/453 |
| 3,903,515 | 9/1975 | Haydon et al. | 340/309.4 |
| 3,903,857 | 9/1975 | Honig et al. | 123/117 |
| 4,176,395 | 11/1979 | Evelyn-Veere et al. | 364/145 X |
| 4,213,182 | 7/1980 | Eichelberger et al. | 364/145 X |
| 4,217,646 | 8/1980 | Caltagirone et al. | 364/493 |
| 4,293,915 | 10/1981 | Carpenter et al. | 364/145 X |
| 4,387,420 | 6/1983 | Singhi et al. | 364/145 |

OTHER PUBLICATIONS

Operator's Manual for Paragon EC74 Programmable Time Controller—Nov. 1983—pp. 1-27.
Brochure for Simplex 2400 Energy Management System—date unknown—pp. 1-3.
Brochure for Simplex 2350 Master Time System—date unknown.
Brochure for Unitec Accumaster II and Accumaster 3000 Digital Master Clocks—date unknown.
Brochure for ChronTrol Timer by Lindurg Enterprises, Inc.—1981.
Brochure for Amano Model SQ-200 Program Timer—date unknown.
Brochure for Lathem LTR 8—128 Master Control Clock System—1982.
German article entitled "Die elektronische Programm-Zietung" by Klaus Ottenroth and Norbert Lexy (and English translation)–1974 pp. 185-193.

Primary Examiner—Joseph Ruggiero
Attorney, Agent, or Firm—Leydig, Voit & Mayer

[57] ABSTRACT

A user-programmable clock is provided for executing events defined by functions executed at a particular time and selected zones and for selected schedules. The clock includes an event memory for receiving zone and schedule data from a keyboard by way of a processor wherein the event memory is segregated into first, second and third tiers of event data. The processor of th clock is responsive to the keyboard for routing zone and schedule data entered from the keyboard to one of the three tiers of the event memory. The first tier of the event memory includes a plurality of locations wherein each location corresponds to an increment of time. Means are provided for selecting data stored in the first tier of the event memory at address locations corresponding to time data received from a timing mechanism. Means are also provided for selecting the appropriate data stored in the second and third tiers. Means are provided for combining the data selected from the first, second and third tiers and executing a function in response to the zone and schedule information contained in the combined data in order to execute the function at the time indicated by the time data and in the zones indicated by the combined data.

21 Claims, 14 Drawing Figures

| | $b_7$ | $b_6$ | $b_5$ | $b_4$ | $b_3$ | $b_2$ | $b_1$ | $b_0$ |
|---|---|---|---|---|---|---|---|---|
| 0 | | | | RAM POINTER | | | | |
| 1 | | | | RAM POINTER | | | | |
| 2 | | | | | | | | |
| 3 | | | | REGT | | | | |
| 4 | | | SYSTEM STATUS FLAGS | | | | | |
| 5 | | | | REAL TIME HOURS (BCD) | | | | |
| 6 | | | | REAL TIME MINUTES (BCD) | | | | |
| 7 | HALF-SECOND FLAG | | | REAL TIME SECONDS BINARY | | | | |
| 8 | | | | RAM POINTER | | | | |
| 9 | | | | RAM POINTER | | | | |
| 10 | | | | | | | | |
| 11 | | | | | | | | |
| 12 | | | | REAL TIME HOURS IN BINARY | | | | |
| 13 | | | | REAL TIME MINUTES IN BINARY | | | | |
| 14 | | SYSTEM STATUS FLAGS | | | | LAST KEY PRESSED | | |
| 15 | | DAY NUMBER | | | CONTROL DATA FOR MULTIPLEXING DISPLAY | | | |

FIRST TIER

| MEMORY ADDRESS | MEMORY DATA |||| SCHEDULE ||||
|---|---|---|---|---|---|---|---|---|
| | ZONE |||| | | | |
| (MINUTE) 1 | ZONE 1 | ZONE 2 | ZONE 3 | ZONE 4 | A | B | C | D |
| ⋮ | | | ⋮ | | | | ⋮ | |
| (MINUTES) 1000 | ZONE 1 | ZONE 2 | ZONE 3 | ZONE 4 | A | B | C | D |
| ⋮ | | | ⋮ | | | | ⋮ | |
| (MINUTE) 1440 | ZONE 1 | ZONE 2 | ZONE 3 | ZONE 4 | A | B | C | D |

SECOND TIER

| MEMORY ADDRESS | MEMORY DATA ||||
|---|---|---|---|---|
| | ZONE ||||
| MONDAY | ZONE 1 | ZONE 2 | ZONE 3 | ZONE 4 |
| ⋮ | | ⋮ | | |
| SATURDAY | ZONE 1 | ZONE 2 | ZONE 3 | ZONE 4 |
| SUNDAY | ZONE 1 | ZONE 2 | ZONE 3 | ZONE 4 |

THIRD TIER

| MEMORY ADDRESS | MEMORY DATA |||| SCHEDULE ||||
|---|---|---|---|---|---|---|---|---|
| | ZONE |||| | | | |
| OVERRIDE ADDRESS | ZONE 1 | ZONE 2 | ZONE 3 | ZONE 4 | A | B | C | D |

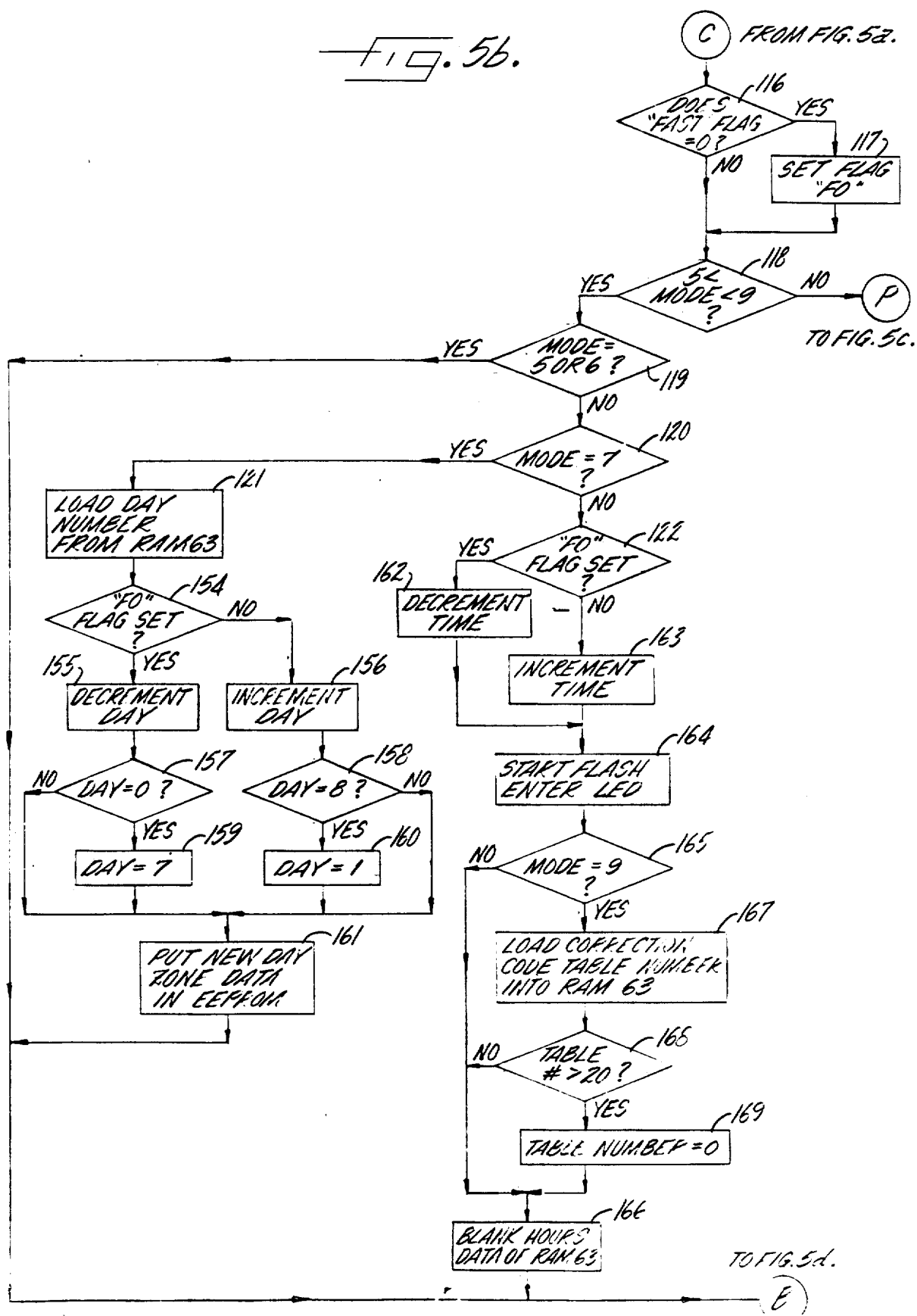

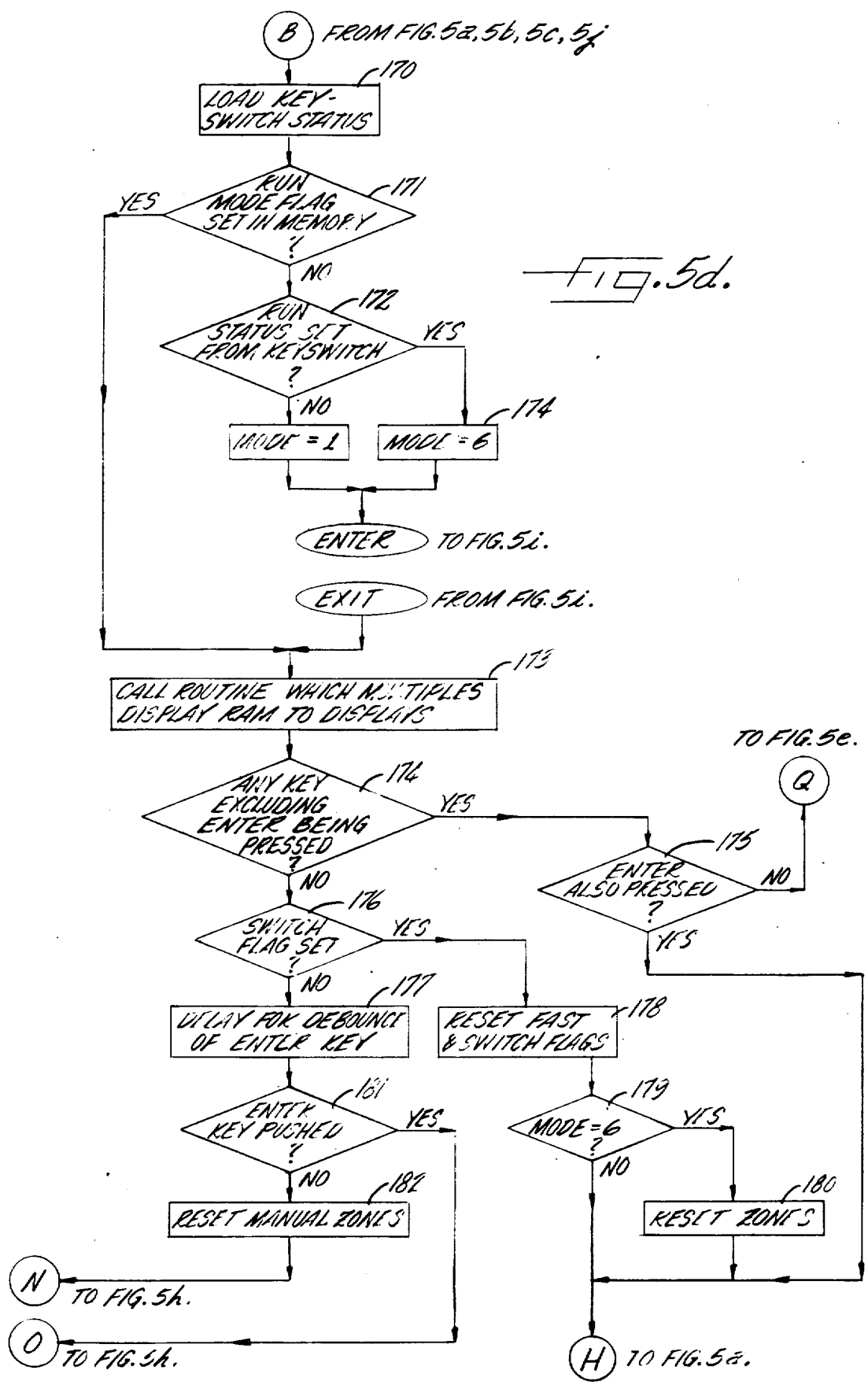

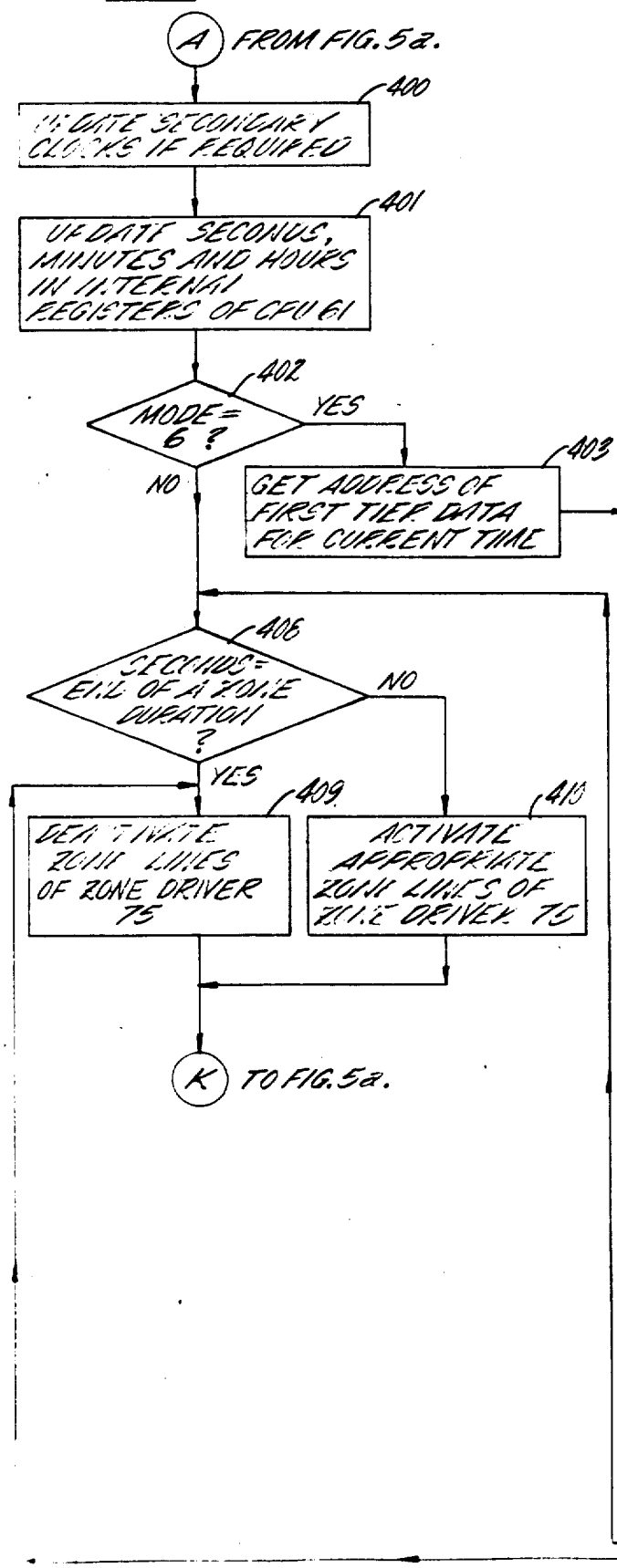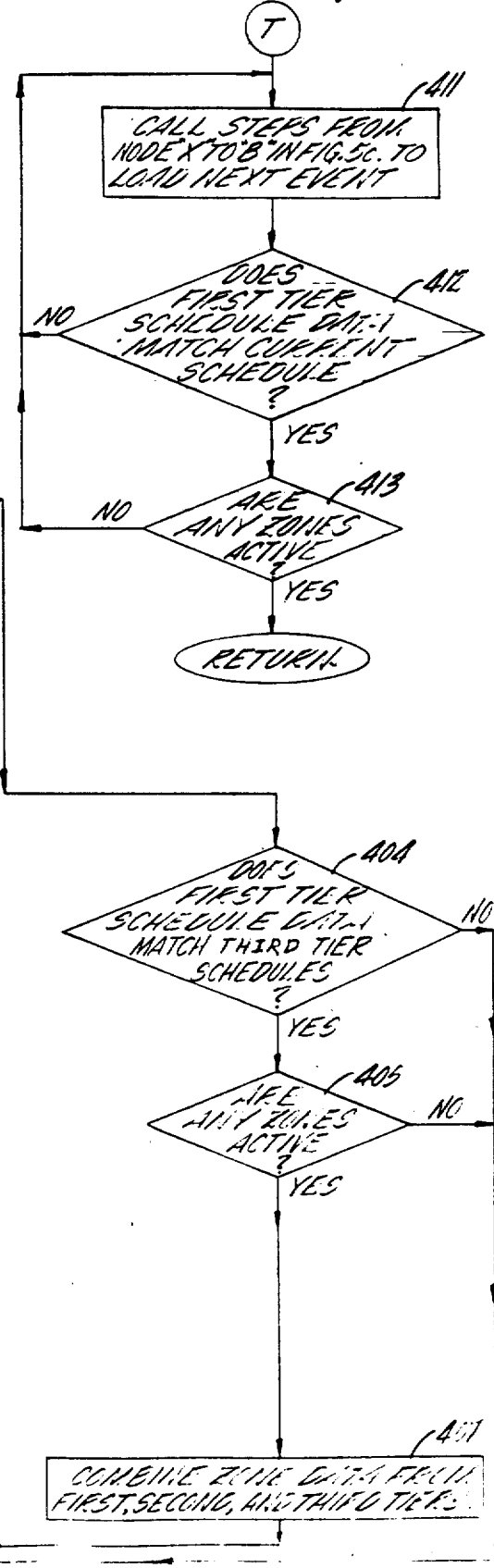

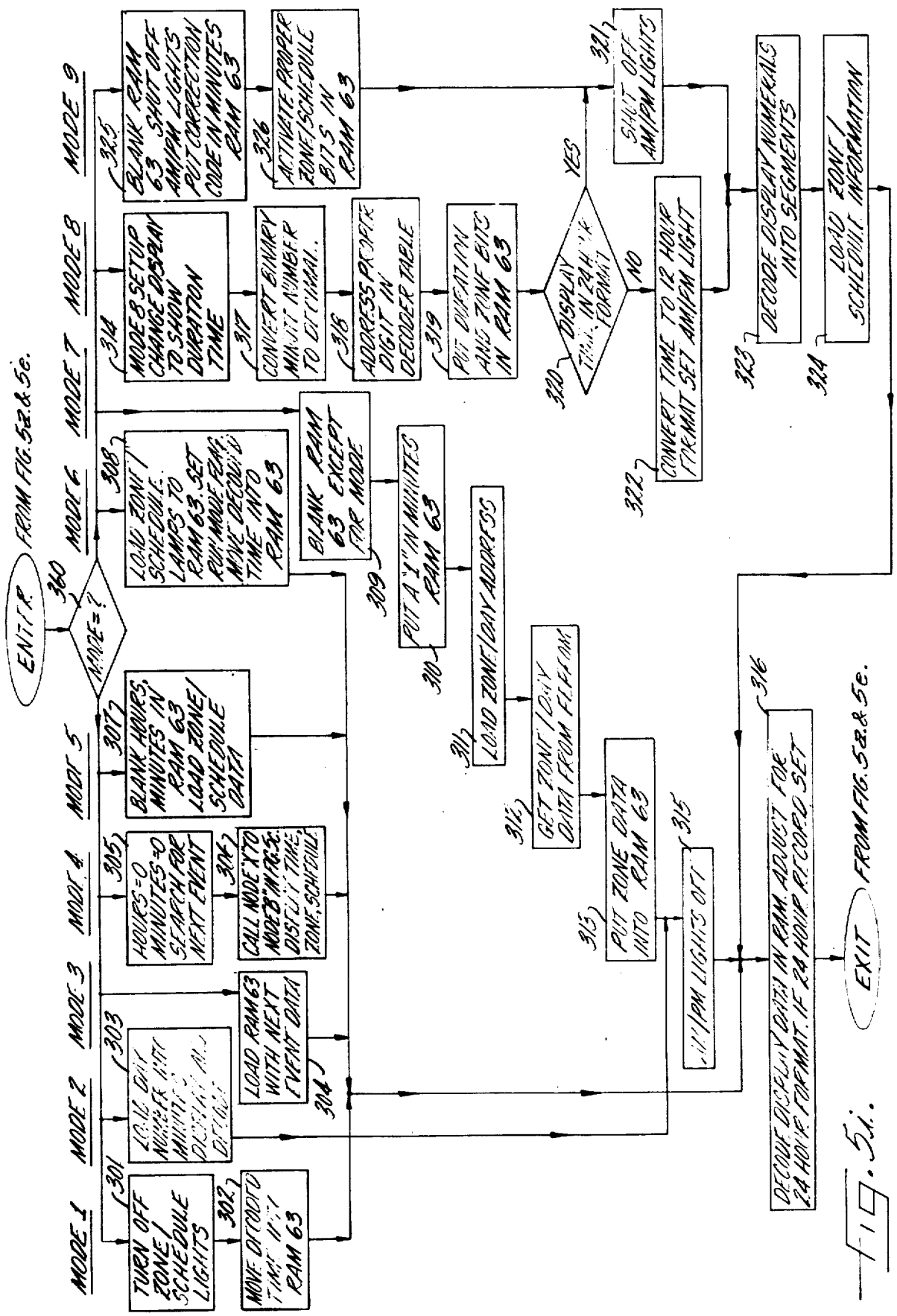

4,677,541

PROGRAMMABLE CLOCK

TECHNICAL FIELD OF THE INVENTION

This invention relates to automatic control of timed events, and more particularly, to a programmable clock.

BACKGROUND

Programmable clocks are useful, for example, in schools where class schedules remain relatively fixed and bells or other audible devices are used to signal the beginning and end of each class period. The timing and control of the bells or other audible devices can become relatively complex because different zones of the school can be on different schedules, the schedule can change from day to day, special events such as holidays or assembly days can dictate a changed schedule for a particular day, and the like. In addition, it is very desirable for the system to provide some simple means for altering the timed events, such as when schedules change, or with the time change to or from daylight savings time.

In the past, the most popular manner of accomplishing automatic control of the timed events described above has involved the employment of electromechanical timing devices. The "events" in such devices were typically programmed by mechanical means such as bending tabs on synchronously rotating wheels inserting or removing pins in synchronously rotating drums or punching a tape with coded events and inserting the tape into the electromechanical timing mechanism. All of such programming techniques are characterized as comparatively complex and typically require a serviceman to be called in order to alter the program. Even the simple alteration occasioned by switching to or from daylight savings time typically requires the attendance of a serviceman. In addition, electromechanical systems which were capable of providing individual zone control and the like became relatively complex.

There have recently been introduced programmable devices for automatic control of electrical loads such as heating, air conditioning, lighting and alarm systems which can also be configured to ring bells in schools. Such systems are typically microprocessor based, and usually include a keyboard and display used to guide the event programming function. Such systems generally focus on an "event" as a relatively simple function affecting a single load, a single day, a single time on that day and a single switching operation. An example of such a system is described in U.S. Pat. No. 4,293,915 to Carpenter et al. In the school environment where there are often multiple zones on different schedules, differences in schedules from day to day, and the like, the number of events which need to be programmed into such systems expands rather dramatically. In addition, although the systems have keyboards for user programming, for a variety of reasons the programming task can become somewhat complicated, requiring a programmer with a comparatively high degree of skill and training.

One programmable clock which addresses the foregoing problems is the model 2424 manufactured by Rauland-Borg Corporation of Chicago, Ill. The model 2424 is disclosed in U.S. Pat. No. 4,387,420 to Singhi et al which is assigned to the assignees of the present invention. The user-programmable clock disclosed in the Singhi et al. patent employs a system which allows for the programming of comparatively complex events wherein each event includes a single time and any combination of days and zones. Programming of the clock disclosed in the Singhi et al. patent is simplified by providing an immediate indication of an erroneous entry along with a signal distinguishing between various potential types of errors.

SUMMARY OF THE INVENTION

In view of the foregoing, it is a primary object of the invention to provide a user-programmable clock in which the programmed event is programmed in a tiered format such that a non-technical user can easily load, edit or temporarily cancel events. In that regard, the event memory is divided into a plurality of storage areas which are programmed separately and whose data is combined with an event which is executed at the time represented by the binary address of the first tier.

More particularly, it is an object of the present invention to provide a user-programmable clock in which a programmed event can be scheduled for each minute of a 24-hour period without requiring a prohibitive amount of event memory. In this connection, it is also an object of the invention to provide a user-programmable clock in which the programmed events for a 24-hour period can be tailored to provide an event schedule for each day of the week.

It is a detailed object of the invention to provide a user-programmable clock having an event memory which minimizes required storage space by eliminating the need for storing time and day information for the schedule events.

A further detailed object is to provide a user-programmable clock in which the first tier of an event can be "bulk programmed" or "bulk erased" by a non-technical user.

Other objects and advantages will become apparent upon consideration of the following detailed description when taken in conjunction with the drawings.

BRIEF DESCRIPTION OF THE DRAWINGS

FIG. 3 is a diagram which schematically illustrates the register structure of the microprocessor of the programmable clock;

FIG. 4 is a diagram schematically illustrating the memory organization associated with the microprocessor; and FIGS. 5a-5j are flowcharts describing the structure of the program associated with the microprocessor.

While the invention will be described in connection with the preferred embodiment, there is no intent to limit it to that embodiment. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
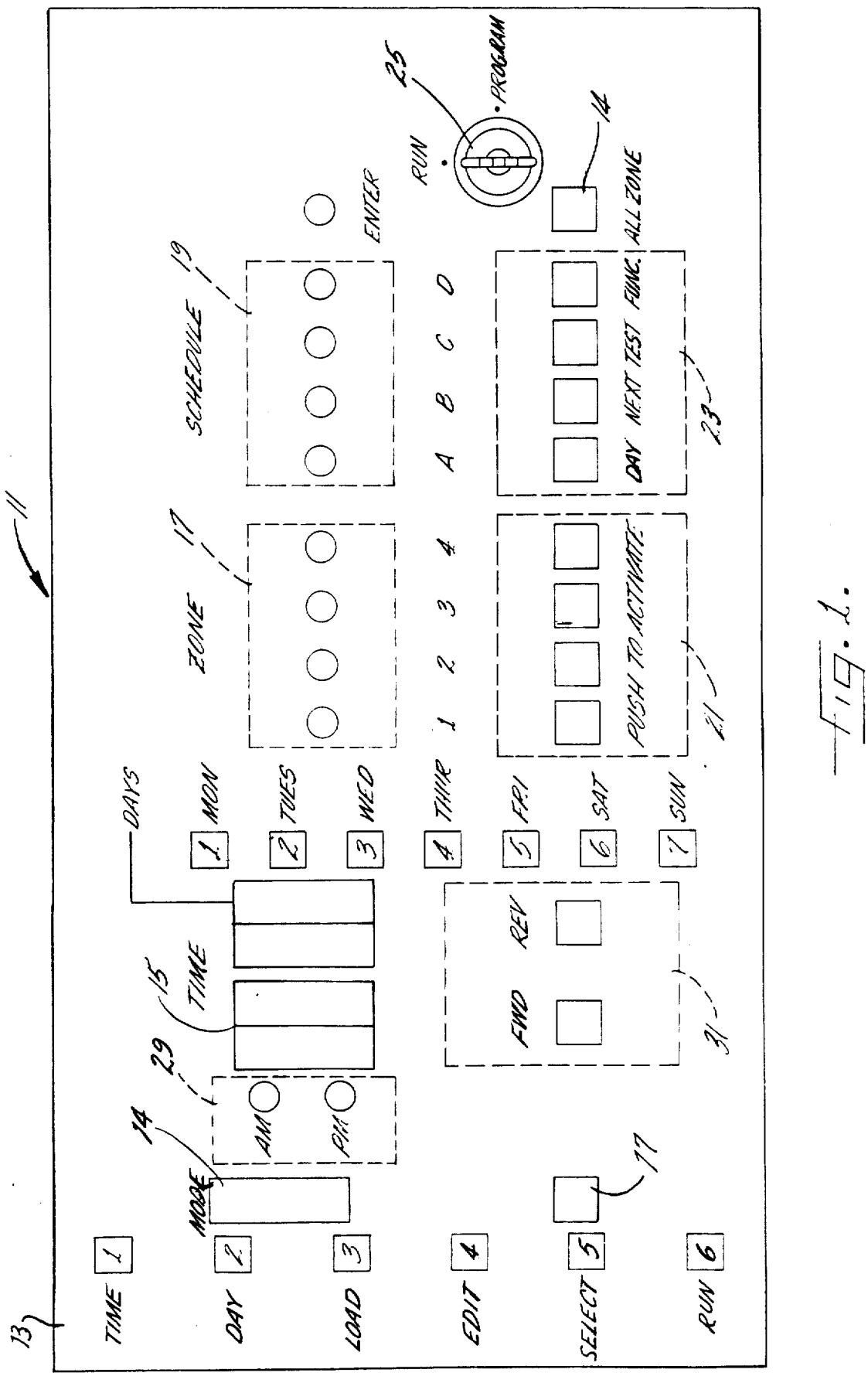
FIG. 1 is a view illustrating the front panel of a programmable clock exemplifying the present invention.

Turning to the drawings and referring first to FIG. 1, a front panel 13 of a user-programmable clock 11 utilizes a plurality of keys distributed on the front panel to provide various clock features. Specifically, the clock 11 operates in one of nine possible modes. One of the modes is the run mode (mode six). In order for the clock 11 to enter this mode, a keyswitch 25 must be turned to its "run" position. Alternatively, turning the keyswitch 25 to its "program" position, enables the clock 11 to operate in one of eight program modes. When the rotatable keyswitch 25 is in the "program" position, the mode key 27 is enabled to select any one of the first five program modes. The particular program mode selected is displayed by the mode display 24 located directly above the mode key 27 on the front panel 13. Each of the eight program modes is associated with a displayed number one through nine (six is the run mode). Keystrokes of the mode key 27 will select one of the first five program modes in numerical sequence. For example, turning the rotatable keyswitch 25 from its "run" position to its "program" position, the mode display 24 changes from a numeral six (run mode) to a numeral one which indicates the clock is in mode one, i.e., the time mode. From mode one, a keystroke to the mode key 27 will sequence the mode display 24 to a numeral two (mode two); another keystroke will sequence the display to a numeral three (mode three), etc. The clock 11 will recycle its mode status to mode one when the mode key 27 is pressed while the clock 11 is in mode five. The remaining three program modes are enabled by keystrokes to a special combination of keys which will be described hereinafter in connection with the operation of these mode.

The nine modes of the clock 11 are as follows: time (mode one), day (mode two), load (mode three), edit (mode four), select (mode five), run (mode six), day-of-week mode (mode seven), duration mode (mode eight) and correction code mode (mode nine). The present mode of the clock 11 is displayed as a number one through nine on the seven-segment mode display 24. In the time and day modes, the current time and day stored within the clock may be corrected. The time and day is thereafter updated by internal circuitry of the clock 11.

In the load mode, "event" data may be entered into an event memory of the clock 11. As used herein, an "event" is an instruction specifying the execution of one or more functions to be performed at a particular time, day and location identified by the stored "event" data. The function executed may be the ringing of bells, the sounding of alarms or any other function which is time dependent. The edit mode allows the event data programmed in the load mode to be reviewed in time sequence and edited, or erased, if desired. The select mode allows particular event data entered in the load, edit or day-of-week mode to be overridden. As will be explained in greater detail hereinafter, the overriding of event data by the select mode adds flexibility to the programming of the clock 11. For example, if zone one of a building is currently unused because of construction in the zone, mode five may be used to cancel all the events which occur in the zone. Of course, the run mode is the normal mode of the system wherein events are executed at their programmed time.

Modes seven, eight and nine are program modes which usually are used less often than program modes one through five. Therefore, they are not accessible in the straightforward manner of the first five modes, i.e., simply turning the keyswitch 25 to the "program" position and pressing the mode key 27. As explained hereinafter, a special combination of key closures enable the clock 11 to enter these last three program modes. In the day-of-week mode (mode seven), event data corresponding to a particular day of the week is entered in the event memory of the clock 11. The duration mode (mode eight) allows the duration of an event to be programmed from one second to sixty seconds in duration. A separate duration can be set for each zone. Finally, the correction code mode (mode nine) programs the clock 11 to correctly drive different types of secondary clocks (e.g., analog or digital).

In practicing one aspect of the invention, essential zone and schedule data from zone keys 21 and schedule keys 23, respectively, are entered into the event memory by way of two program modes. In a first program mode the time of an event is identified with selected zones and schedules. In a second program mode, the day of the week is identified with selected zones. The combination of the data entered in these two modes gives an event which is executable in selected zones and schedules for a particular time and day. In a third mode, zone and schedule data is provided which can override the zone and schedule data selected for execution by the combination of the data from the first two program modes. Specifically, event data which defines an executable event is stored in three tiers of the event memory with each tier corresponding to data entered from one of the modes three, five and seven. In order to construct an executable event, the three tiers of data in the event memory are combined by performing a logical AND function between the three sets of data wherein one set has been identified from each tier. In the first tier (the first program mode), the particular event data is identified by locating the data address corresponding to the event time. In the second tier (the second program mode), the particular event data is identified by locating the data corresponding to the day of the week. For the third tier (the override data from the third program mode), the data is independent of time of day or day-of-week information. In the first and third tiers of data, only zone and schedule information need be stored. In the second tier of data, only zone data need be stored.

In practicing another aspect of the invention only zone and schedule data is stored in the event memory by providing the first tier of the event memory with address locations having a correspondence to the time in minutes in a day (i.e., 1440 locations) and the third tier of the event memory with address locations having correspondence to the days of a week (i.e., seven locations). By providing an event memory organized in the foregoing manner, the necessity for storing time and day information is eliminated thereby freeing the memory of the requirement of storing this additional event information. By constructing the event storage in a three tiered structure with time and day information tied to address locations of the event memory, only zone and schedule data need be stored by the event memory in order to define an executable event.

By providing the foregoing three tiered memory structure, each minute of each day can be programmed with maximum flexibility while maintaining the size of required memory storage at a modest level. Since the first tier of event data provides zone and schedule data for each minute of a day and since the second tier of event data defines allowable zones for each day, the logical AND combination of these two sets of zone data for a particular time (first tier) and day (second tier) provides an executable event (subject to the override data of the third tier) i.e., activation of selected zones at a particular minute of a particular day in a selected schedule.

In practicing yet another aspect of the inventions, the clock 11 may be programmed for an event in a particular zone to be as short as one second or conceivably as long as required. By adjusting the duration of an event for a particular zone in mode eight, the event can be made of a length of one second; alternatively, it can be made as long as 60 seconds. If the event duration is made 60 seconds for a particular zone and the event data is repeated in memory locations corresponding to consecutive minutes in the first tier of memory locations, the event in the particular zone will extend from the first execution minute into subsequent minutes until the event data is no longer present. In order to provide for this functional feature, memory locations in the first tier of the event memory can be automatically loaded with event data in memory locations corresponding to consecutive minutes such that an event will have a duration equal to the number of minutes in which that data was entered.

A total of fourteen hundred and forty events may be programmed into the programmable master clock 11 by way of the plurality of push button keys provided on the front panel 13 of the clock. Each of the fourteen hundred and forty events is readily programmed in modes three, five, and seven for (1) the day and time of the event, (2) the selection of any one zone (i.e., area of the building) or any combination of zones where the event is to take place, and (3) the type of schedule desired (e.g., normal day, assembly day or holiday schedules). Each day is programmed for individual zones in mode seven to allow an event for a particular day only in the programmed zones. As explained in greater detail hereinafter, the programming of an event into the master clock is accomplished by pushing the appropriate keys in a predetermined sequence. During the programming of an event, the event data of each mode is fully displayed on the front panel 13 and thereafter entered into the event memory in the master clock 11 by pressing the enter key 14.

All of the event data programmed and stored into the master clock 11 may be displayed by the seven-segment display 15 and LEDs 17 and 19 provided on the front panel 13. In order to easily scan the schedule of event data in the first tier of the event memory, mode four may recall the events to the display 15 and LEDs 17 and 19 in time sequence. Events may also be tested in time sequence beginning with the event next in time. In order to modify a previously entered event, the event may be recalled from memory and displayed so as to provide visual verification of the correction.

Ordinarily, the master clock 11 is in the run mode wherein the seven-segment mode display 24 of the front panel 13 is energized to display a numeral six. In the run mode, the master clock 11 executes events stored in the event memory when the event time corresponds to the real time. In order to modify the data stored in the event memory of the master clock 11, the keyswitch 25 must first be rotated from a "run" position to a "program" position. After the keyswitch 25 has been rotated, the mode key 27 is pressed until the appropriate mode number is displayed by the mode display 24. For example, in order to adjust for the correct day, the mode key 27 is pressed until the numeral two is displayed by the mode display 24 which indicates that the day mode has been selected.

The master clock provides four keys 21 to manually control the selection of four possible zones in constructing event data in the load or edit modes. When the clock is in the run mode, enter key 14 provides for simultaneous activation of all four zones. Provision is also made for four separate program schedules, each programmed by a separate one of the keys 23.

Since all events entered into the master clock 11 are retained in a non-volatile event memory, a power failure will not require reprogramming of the clock. Evidence of a power failure is reflected by the flashing of the time display 15 upon reapplication of power. When power is restored, only the current time and day need be reset.

Adjacent the mode display 24 is an AM/PM LED display 29 for indicating AM or PM time during twelve-hour clock operation. The LEDs do not light during the twenty-four hour clock operation.

Four seven-segment displays comprise the time display 15 for displaying time in hours and minutes. When the master clock 11 is in the time, load, edit or run modes, the time display 15 displays time. When the master clock 11 is in the day mode (mode two), the most rightward seven-segment display of the time display 15 shows the current day of the week and the other three seven-segment displays are blanked. When the master clock 11 is in the run mode (mode six) the current day of the week is shown in the most rightward seven-segment display of the time display 15 in response to a keystroke to the "day" key of the keys 23.

In modes one, three and four, the forward and reverse keys 31 are used to increment and decrement, respectively, time in minutes and hours until the desired time appears on the time display 15. In mode two, in order to increment or decrement the current day and the day displayed by the time display 15, the forward or reverse key 31 is pressed.

When the clock is in the load, edit or select modes, the zone keys 21 (labeled one through four) can be activated to select a particular zone or combination of zones. When one of the zone keys 21 is pressed, one of the LEDs 17 above the key gives a visual indication the zone has been selected. Referring to the four keys 23 associated with schedule selection in the load, edit or select modes, keystrokes to each key will select a corresponding schedule (i.e., A through D) and also give a visual indication of the selected schedule by way of the LEDs 19 associated with the keys. Entry into the event memory of selected zones and schedules is executed by a keystroke on the enter key 14.

A comprehensive understanding of all system functions will be easily derived from a description of the program structure to follow. However, to put that description in perspective, the functions of the clock will first be described from the viewpoint of accomplishing those functions using the keys on the front panel 13.

When the rotatable keyswitch 25 is in the "run" position, the zone and schedule keys 21 and 23, respectively, assume functions which are indicated by the labeling below each key. In particular, while in the run mode, a keystroke to any of the zone keys 21 will activate the corresponding zone bells for as long as the key is pressed. Accordingly, the display panel below the four zone keys is labeled "push to activate". For the schedule keys 23 (which control the selection of schedules when the clock 11 is in the program modes, one through five) a keystroke of the most leftward key when the clock is in the run mode will cause the time display 15 to display in the most rightward digit a numeral one through seven corresponding to the current day.

Referring to the keys 23 from left to right, in the run mode a keystroke on the second key 23 causes the time display 15 and the zone and schedule LEDs to momentarily blank and then reappear showing the next scheduled event in terms of time and zone. When pressed, the third key 23 will cause the next event to be displayed and tested. In response to the third key 23, the master clock 11 will perform all the appropriate responses for the next event except the bells of the selected zone or zones will not be activated. In order to alert the user that the master clock 11 is in the test state, the time display 15 and zone and schedule LEDs 17 and 19 flash. To exit the test state, a keystroke on the last key 23 (i.e., the most rightward key) will exit the master clock 11 from the test state.

Finally, a keystroke on the enter key 14 when the master clock 11 is in the run mode will cause all the zone bells to activate for as long as the key is pressed. If the key is pressed while the master clock 11 is in the test state, only the bells of the displayed zones will be activated.

When power is first applied to the clock 11, the time display 15 will flash (after a small delay), indicating that there has been a temporary loss of power. The number one or six, depending on the position of the keyswitch 25, will be displayed by the mode display 24. In the time display 15, 12:00 AM will be displayed if the twelve-hour format is selected or 00:00 if the twenty-four hour format is selected. To select either the twelve or twenty-four hour format, the keyswitch 25 must be placed in the "program" position and the most leftward zone key 21 must be pressed and held. With this zone key 21 held down, a keystroke on the enter key 14 will alternate the time display between twelve and twenty-four hour operation. The following description assumes a twelve-hour format for the time display. When the time display is in a twenty-four hour format, the AM/PM LEDs will remain off.

To program the clock 11 after power is applied, the keyswitch 25 is turned to its "program" position. The mode display 24 will indicate the clock 11 is in mode one, i.e., the time mode.

When the rotatable keyswitch 25 is in the "program" position, keystrokes on the mode key 27 will sequentially move the clock through the five different program modes, i.e., time, day, load, edit and select. In response to a keystroke on the mode key when the clock is in the select mode (i.e., mode five), the clock will move to the time mode (i.e., mode one) instead of incrementing to mode six, i.e., the run mode. In other words, when the rotatable keyswitch is in the program position, only the program modes are accessible. In comparison, when the rotatable keyswitch is in the run position, only the run mode (mode six) is accessible.

Treating each of the modes of the program state in detail, the time mode (designated as mode one on the front panel 13) activates the forward and reverse keys 31 to set the time display 15 to the present time. The forward and reverse keys 31 will increment and decrement, respectively, the displayed time. In a manner well known in the electronic watch art, a keystroke on the forward or reverse keys 31 increment or decrement, respectively, the displayed minutes or hour depending on the duration of the keystroke. Specifically, if either key 31 is only momentarily pressed, the displayed minutes will be incremented or decremented. If either key 31 is held pressed for more than one second, the displayed hours will be incremented or decremented.

In response to incrementing or decrementing the displayed time while in the time mode (mode one), the LED associated with the enter key 14 will begin to flash. The flashing LED indicates to the user that in order to permanently enter the displayed time, the enter key 14 must be pressed. If the time mode is exited before the enter key 14 is pressed, the modified time displayed by the time display 15 will not be entered and the clock will return to its former time. When the correction of the time display 15 is completed and the enter key 14 is pressed, seconds (not displayed) are reset to zero inside the master clock 11. Therefore, in order to properly set the correct time, the time display 15 should be set one minute ahead of the present time and the enter key 14 should be pressed at exactly zero seconds. In response to the keystroke on the enter key 14, the clock 11 will automatically move from the time mode (mode one) to the day mode (mode two) and the mode display 24 will automatically indicate the change by changing from a one to a two.

In the day mode, the most rightward digit of the time display 15 is activated to serve as a day display by displaying one of the digits one through seven wherein each digit corresponds to a day of the week. In order to correct for the current day, the forward or reverse keys 31 are pressed to increment or decrement the displayed digit. When the displayed digit has been changed to the digit corresponding to the present day, a keystroke on the enter key 14 will load the displayed day into the clock's memory. The same keystroke on the enter key 14 will turn off the flashing LED above the enter key (activated when the displayed digit was changed) and the clock 11 will automatically advance to the load mode. In order to indicate the change of mode, the mode display 24 will automatically advance from displaying the digit two to displaying the digit three.

In the load mode (mode three), an event can be programmed, or loaded, into the memory of the master clock 11 by way of the various keys on the front panel 13. Specifically, for a particular time displayed by the time display 15, any combination of zones and schedules may be selected and loaded into memory. The selection of zones and schedules is made by the keys 21 and 23, respectively, and is indicated by the illumination of the LEDs associated with the selected zone and schedule keys.

In response to the selection of the load mode, the time display 15 will display the present time. In order to program the first tier of an event, the forward and reverse keys 31 are utilized to set the time display 15 to the event time in the same manner that the time display was modified in the time mode. After the event time is selected and displayed, the appropriate zones are selected by pressing the associated zone keys 21. In order to provide for different schedules (e.g., summer, fall, winter and spring quarters), schedule keys 23 are selected. The zone and schedule information can be programmed in any sequence.

Whenever any event element (i.e., time, zone or schedule) is changed by a keystroke while in the load mode, the LED associated with the enter key 14 will flash indicating that the displayed information has not yet been loaded into the memory of the clock 11. A keystroke on the enter key 14 when its associated LED is flashing will enter the displayed event element into memory. In response to a keystroke on the enter key 14, the LED of the enter key will cease to flash, thereby indicating that the clock 11 is ready to accept the new event data. By using the load routine just described, all of the first tier of the events may be programmed into the clock's memory.

A keystroke on the mode key 27 when the clock 11 is in the load mode will change the clock to the edit mode (mode four) and the mode display 24 will increment to display a digit four. In the edit mode, the first tier of an event, i.e., the event data loaded in mode three, may be modified. Upon entering the mode, the first event data after midnight is initially displayed on the front panel 13. The edit mode allows event data stored in memory to be reviewed in chronological order and modified or deleted if desired. In order to increment to the next event data, the forward key 31 is pressed. Alternatively, a keystroke to the reverse key 31 will decrement to the chronologically previous event data relative to the event data currently displayed. If the forward or reverse keys 31 is held pressed, the programmed event data will be scanned at a rate of two data locations per second. Even if no event is scheduled at midnight, the time will be displayed when incrementing or decrementing the programmed event data.

In order to edit event data in the first tier when the clock 11 is in the edit mode, the zone and schedule information of the data can be changed by a keystroke to the appropriate zone or schedule keys 21 and 23, respectively. For example, if the event data shows all zones and all schedules activated for a particular time (i.e., all zone and schedule LEDs lit), changing the event data to only zones one and two and schedules "A" and "B" requires zone keys three and four and schedule keys "C" and "D" to be pressed. Removal of these zones and schedules from the event data is verified by the extinguishment of the LEDs 17 and 19 associated with those zone and schedule keys. As soon as a change is made by a keystroke to the zone or schedule keys 21 and 23, respectively, the enter LED will begin to flash indicating that the displayed event data is different from the event data stored in the event memory. After the event data has been edited to the correct event information, a keystroke on the enter key 14 will enter the new event information in the appropriate memory location.

From the edit mode, a keystroke to the mode key 27 will increment the clock to the select mode (mode five). Mode five provides the third tier of the events programmed into the clock. In mode five, zone and schedule data is entered for the purpose of providing an override function so that event data programmed into the clock memory in modes three and four can be overridden by the zone and schedule selection made in the select mode. As with the other program modes, a keystroke onto any of the zone or schedule keys 21 and 23, respectively, will cause the enter LED to begin flashing, indicating that the currently displayed information is not stored in memory. A keystroke to the enter key 14 will store the information and extinguish the enter LED. By adding the third tier to the events stored in memory particular zones or schedules can be removed from the daily program.

In order to select the run mode, mode six, the rotatable switch key 25 must first be switched to the "run" position. By placing the rotatable switch key 25 in the "run" position, the mode display 24 automatically displays the digit six which indicates to the user the clock is in the run mode. When the rotatable keyswitch 25 is placed in the run mode, the program modes are inhibited. In the run mode, the current time of day is displayed by the time display 15. The zone and schedule LEDs associated with keys 21 and 23, respectively, show the zones and schedules selected during the programming of the clock in the select mode (mode five). While in the run mode, the enter LED is off, and the number six appears on the mode display 24.

As briefly mentioned earlier, when the clock is in one of the "program" modes (i.e., modes one through five), the zone and schedule keys 21 and 23, respectively, have the functions indicated on the front panel 13 above each key. In contrast, when the clock 11 is in the run mode, the zone and schedule keys, 21 and 23 respectively, provide the functions indicated on the front panel 13 below each key. For example, when one of the zone keys 21 is pressed while the clock 11 is in the run mode, the corresponding zone is activated for as long as the key is pressed. When the "all zone" key 14 (i.e., the enter key 14 in the program state) is pushed, all zones are activated for as long as the key 14 is pressed.

Regarding the four schedule keys 23, when the key identified as the "day" key in the run mode is pressed, the present day of the week will be displayed as a single digit in the most rightward digit of the time display 15. The numeral indication for the day will be displayed for as long as the "day" key is pressed. When the schedule key 23 identified as the "next" key is pressed, the time display 15 will show the next event time. Also, the illuminated LEDs associated with the zone keys 21 will indicate which zones are to be activated. This next event will be displayed for as long as the next key is pressed.

When the schedule key 23 identified in the run mode as the "test" key is pressed, the time display 15 will show the time of the next event. The zones to be activated will be indicated by the illumination of the associated LEDs 17 above the zone keys 21. In order to indicate that the clock 11 is in the test mode, the time display 15 and zone LEDs 17 will flash. In order to test the activation of the displayed zones, a keystroke on the "all zone" key while in the test state will activate the indicated zones. The zones will remain active for as long as the "all zone" key is pressed. A second keystroke to the "test" key will advance the time display 15 to the time of the next executable event. The master clock can exit the test state and return to its normal display by pressing any one of the zone or schedule keys 21 and 23, respectively, except for the test key. In order to test events for a day other than the present day, the program state must be entered and placed into the day mode (mode two) so as to select the particular day whose events are to be tested.

Special programming is provided in modes seven, eight and nine which are unmarked on the display panel. In order to enter these special modes, the rotatable keyswitch 25 is first moved to the program position. With the mode display 24 showing mode five, the mode key 27 is pressed (which will display mode one) and, while the mode key is pressed, the enter key 14 is also pressed. This will change the mode display 24 from mode five to mode seven. Further keystrokes to the mode key 27 will increment the master clock 11 through modes seven, eight and nine.

In mode seven, the most rightward digit of the time display 15 will show the current day of the week. Different zone combinations can be obtained for each day of the week. In mode seven, the second tier of event data is programmed into the event memory of the clock 11. In the second tier, zone information is added to the memory for each day of the week. In this second tier of data for an event, certain days can be selected for which the zone data contained in the first tier are not to be executed at the indicated time. For example, if the first tier of data for an event indicates an event at 3:00 PM in zone one and schedule A, the event data added in mode seven can cancel the event defined by the data of the first tier for Saturdays and Sundays. More specifically, the zones which are not common to both the first and second tiers will not be executed at the time and day identified by the address locations of the first and second tiers of data. (If none of the schedule data in the third tier (the override data) corresponds with schedule data in the first and second tiers of data, then no executable event occurs.) The data derived from combining the first and second tiers of data defines zone and schedule information for a particular time and day. The data now defines an executable event for a specific time and day. If the user chooses to cancel the executable event, the zone and schedule data entered in mode five can override the otherwise executable event.

When a change is made in the zones or schedules while in mode seven, the enter LED will begin flashing. A keystroke to the enter key 14 will store the displayed information into the clock's memory. Selecting another day of the week and modifying the displayed zone combination will again cause the enter LED to begin flashing. A keystroke to the enter key 14 will again enter the displayed information into the clock's memory. These programming steps can be repeated for each day of the week.

In order to advance from mode seven to mode eight, the mode key 27 is pressed. In mode eight, the duration of zone activation can be programmed. When mode eight is selected, the two most rightward digits of the time display 15 will indicate the activation duration for a particular zone. When mode eight is first entered, the most leftward LED of the LEDs 17 corresponding to the zone keys 21 should be illuminated. The duration of zone activation can be changed using the forward and reverse keys 31 within a range of "00" to "59". A display of a "00" duration time indicates a duration of 60 seconds.

As with the other programming modes, after a change has been made to the time display 15, the enter LED begins to flash. A keystroke to the enter key 14 will enter the displayed information into memory and move the illuminated zone LED 19 to that of the second zone key. Also, the time display 15 will display a new time duration corresponding to the time duration for the second zone. Using this procedure, the duration for all four zones can be entered.

In addition to activating loads such as bells according to event data stored in memory, the clock 11 also serves as a master clock for a system of slave clocks. Typically, the slave clocks are clocks located in individual classrooms throughout the school building. Selection of mode nine enables the clock 11 to properly signal the secondary clocks. In mode nine, correction codes are entered into the master clock 11 which tell the clock what kind of signal the slave clocks require. Specifically, different types of secondary clocks require different types of signals in order to periodically update the secondary clocks. Predetermined correction codes are assigned to the different types of secondary clocks which might be used in connection with the master clock 11. To enter a correction code into the master clock, the time display 15 is incremented by the forward or reverse keys 31 until the proper code is displayed. Two codes may be entered into the memory of the master clock 11 by first selecting the "zone one" key and entering a correction code and then selecting the "zone two" key and entering a different correction code. By entering two complementing correction codes, the master clock 11 is able to simultaneously drive and update two different types of secondary clocks.

Whenever the first code is modified (the code identified when the zone 1 LED is illuminated), the second code is automatically zeroed. As soon as the first correction code is entered by a keystroke to the enter key 14, the enter LED stops flashing and the second code is displayed as "00". If an invalid code entry is attempted the display will flash indicating an error. In case of an error indication, both codes are re-entered. When the entering of the correction codes is completed and the codes have been stored by pressing the enter key 14, the rotatable keyswitch 25 is returned to the "run" position for return to normal clock operation.

If it is desired that a particular zone remain on for an extended duration, interaction between modes three and eight (load and duration modes) can provide such a feature. For example, in mode eight the duration for a particular zone is set to "00" (i.e., 60 seconds). In mode three, the first tier of event data is loaded into memory. Included in the data for mode three is data which selects the same zone selected in mode eight. By pressing and holding the enter key 14 and at the same time holding the forward key 31, the time displayed by the time display 15 will step through minutes. When the end of the intended duration is displayed, the forward and enter keys, 31 and 14, respectively, should be released. For the time period between the time initially displayed and the time displayed after the forward key 31 and enter key 14 were released, the particular zone selected in mode eight will be continuously activated. This procedure, called "bulk programming", may be also used in connection with the reverse key 31. Alternatively, the duration for a selected zone or zones may be set for something less than 60 seconds. In such a situation, repeating the data of the first tier successive address locations in mode three results in a variable duty cycling of the selected zone or zones.

If an event or series of events are required to be erased from memory, mode three provides a procedure by which this can be achieved. After entering mode three, all of the zone and schedule LEDs 17 and 19, respectively, are extinguished and the enter key 14 is pressed and held while at the same time the forward key 31 is pressed and held. The time display 15 will step through event times in one minute increments erasing any first tier event data located at the displayed time. Releasing the forward key 31 and enter key 14 will stop the erase function. As with the foregoing "bulk programming", the reverse key 31 can be used in place of the forward key.

The first tier of the programmed events can be erased from memory by first removing the clock's a-c power and placing the rotatable keyswitch 25 in the "program" position. By pressing and holding the enter key 14 and then re-applying a-c power, the nonvolatile memory holding the programmed events will be erased. The time display 15 will remain blank for 60 to 90 seconds after a-c power is restored. When the display reappears, the twelve-hour time mode is automatically selected. It should be noted that although the first tier of event data is erased by the foregoing procedure, the programming executed in modes five (the second tier), seven (the third tier), eight (duration) and nine (secondary clock codes) is not affected.

Figure 2:
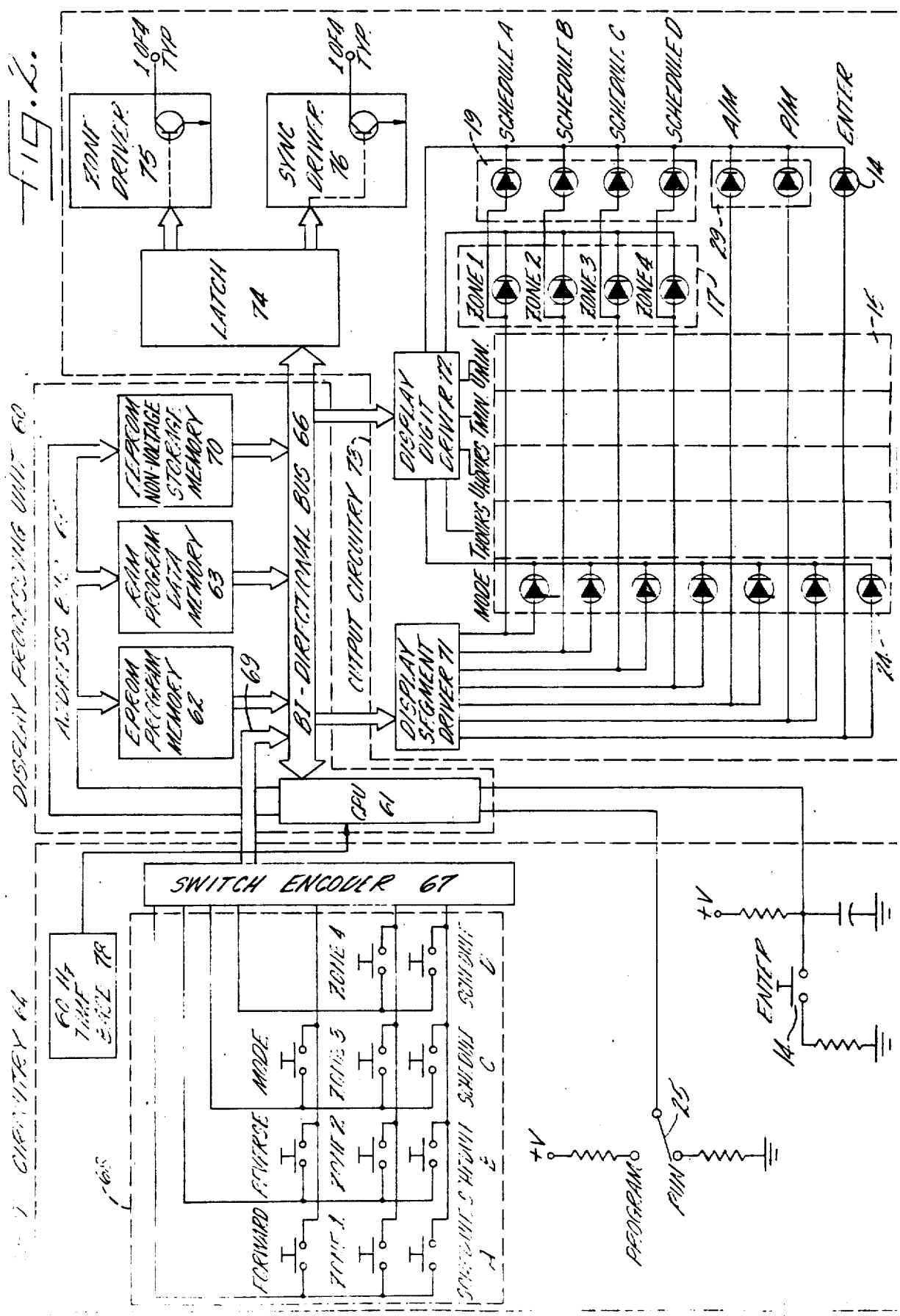
FIG. 2 is a circuit diagram, partly schematic and partly block, illustrating the circuit of the programmable clock of FIG. 1.

Turning now to FIG. 2 there is shown the circuitry which operates to perform the foregoing functions described in connection with FIG. 1. A display processing unit 60 is provided to perform the main control function. Within the processing unit 60 is a microprocessor, in the illustrated embodiment the commercially available Intel 8749 Microprocessor. As will be apparent to those skilled in the art, the figure illustrates the important subelements of the Intel 8749 Microprocessor, including a central processing unit (CPU) 61, associated program memory in the form of EPROM 62 and read/write memory RAM 63. A portion of the RAM 63 includes the display memory in which data to be displayed on the front panel 13 of the clock 11 is stored. In conventional fashion, emanating from the CPU 61 is a memory address bus 65. The CPU also has a bidirectional data bus 66 connected to the memories 62 and 63 as well as to input and output circuitry 64 and 69, respectively.

Turning first to the input circuitry 64, a switch encoder 67 converts a key closure on the front panel 13 to binary data for the CPU 61. Closure of any of the keys of the front panel 13, indicated at 68 in FIG. 2a, produces a data stream on the data bus 69 connecting the switch encoder 67 to the CPU 61. When any one of the front panel keys 68 is depressed, the row and column of the grid formed by their electrical connections which intersect the key are connected to a pair of input ports of the switch encoder 67 in order to indicate to the encoder which switch has been pressed.

In order to provide a storage memory for data input by way of the front panel keys 68, the display processing unit 60 includes an EEPROM 70 (i.e., an Electrically Erasable Programmable Read Only Memory which is coupled to the CPU 61 by way of the address bus 65 and the bi-directional data bus 66 in a conventional manner. The EEPROM 70 offers the advantages of being re-programmable, non-volatile and electrically erasable. Data entered from the front panel keys 68 is temporarily stored in a display portion of the RAM 63. In order to permanently store data into the EEPROM 70, the enter key 14 on the front panel must be pressed to signal the CPU 61 that the data entered by way of the keys 68 is to be permanently stored in the EEPROM 70. As explained in connection with FIG. 1, the clock 11 has program and run states which are controlled by the keyswitch 25. The input of the keyswitch 25 is directly to the CPU 61 so as to signal the CPU whether to interpret closures of the keys 68 as run or program functions as described in connection with FIG. 1.

Turning now to the output circuitry 69, a display segment driver 71 and a display digit driver 72 are driven from the bi-directional data bus to control the light indicators on the front panel 13 of the clock 11. The seven-segment display digits for the time display 15 in FIG. 1 are shown as digits 15A-15D in FIG. 2. The segment driver 71 drives respective anodes in the seven-segment displays whereas the cathodes of the individual displays are driven by respective lines of the display digit driver 72. Accordingly, the digits are strobed in conventional fashion to illuminate the segments which form the displayed digits.

It is worthy of note that the segments are driven directly from the output word of the CPU 61 rather than being decoded by circuitry external to the display processing unit 60. In order to accomplish this direct drive, data is decoded from a BCD format and processed by the processing unit 61 to a seven-segment format. A latch 74 receives zone data from the bi-directional data bus 66 to control the actual execution of an event by zone drivers 75. The latch 74 also receives data for sync drivers 76 which synchronize the secondary clocks. In the illustrative embodiment, driving of the zones is accomplished by a plurality of solid state devices, e.g., transistors, comprising the zone driver block 75. The zone driver block 75 provides the energy to drive bells, alarms and other similar loads. The transistors can be typically a 2076 type integrated circuit. The collector of each transistor is connected to a load in a particular zone which, in a school environment, is typically composed of a plurality of bells. In the exemplary embodiment, four individual zones are provided, such zones being driven by the zone driver 75 which is controlled by data stored in the latch 74 from the data bus 66.

FIG. 3 schematically illustrates the register structure within the exemplary 8749 Intel Microprocessor, which has associated therewith 16 registers, each eight bits wide. It is noted that a number of registers in the processor have functions which are not necessary for an understanding of the present invention, and those registers such as the two and eleven register will not be described herein. The zero, one, eight and nine registers store the RAM pointer binary word which keeps track of the current memory address location of the RAM 63. The four and fourteen registers store the system status flags used by the system program in the EPROM 62. Registers five and six store real time in a binary-coded (BCD) format in order to make available the real time for easy processing to display time on the time display 15. The lower-most four bits of the seven register and designated binary seconds in FIG. 3, store the seconds portion of the current time data. The eight bits of register three, designated REGT are incremented by the 60-hertz power line, by means of hardware, without the use of processor instruction in order to maintain a count of time. Digressing to FIG. 2, there is shown a time base 78 (derived from the 60-hertz power line) whose input is connected to the CPU 61 to increment the REGT register.

In the Intel 8749, the signal from the time base 78 can be used to request a signal which automatically results in incrementing register three which stores the REGT bits. When the number stored in the REGT bits reaches 60, (i.e., after a full second has elapsed) the microprocessor increments the binary seconds bits in register seven to advance the number of seconds by one and resets the REGT bits to zero in order to count the next second. When the binary second bits reach the count of 60, indicating that a minute has passed, the microprocessor zeros the appropriate bits in register seven and increments register thirteen by one (i.e., increments minutes by one). In similar fashion, register thirteen increments register twelve when the real minutes reach 60. Correspondingly, the twelve register, representing hours, increments the AM/PM bit at 12 in register four, and when changing from PM to AM, the AM/PM bit increments the day bits in register sixteen. In the foregoing fashion, the register structure is continually updated to monitor the current time of day and day of week.

Registers zero, one, eight and nine are common to most computer systems, comprising a stack pointer and a main program counter necessary for the housekeeping functions of the microprocessor. Registers four, fifteen and part of the seven are used to store flag and other information whose significance will be better appreciated from the following program structure description.

Turning now to FIG. 4, there is schematically illustrated the general memory organization, within the EEPROM 70 for storing the three tiers of element elements used to form a complete event for execution by the processing unit 60. In particular, a block of 1440 address locations of the EEPROM 70 each contain zone and schedule information for the binary time in minutes corresponding to the binary address location. Specifically, each of the 1440 address locations containing zone and schedule information corresponds to one second in a 24-hour time period.

Referring briefly back to FIG. 1 the 1440 address locations corresponding to the 1440 minutes in a 24-hour time period can be addressed and loaded with zone and schedule information in the load or edit modes, i.e., modes three or four. As used herein, the binary time and corresponding binary address location may be in any number of well known binary formats. But, preferably, the binary times and addresses are not coded. Generally, the correspondence between time and memory address may be indicated as follows:

Memory Address $= K_1 \times$ hours $+$ minutes $+ K_2$ wherein $K_1$ and $K_2$ are constants and the hours, minutes and the constants are expressed in hexadecimal notation. The EEPROM 70 has a second tier of event data which includes an address location for each weekday. In each address, zone and schedule data may be stored. The event data in the first tier of the EEPROM 70 is combined with the zone data in the second tier and is again combined with zone and schedule data in a third tier in order to complete an event for execution.

Still referring to FIG. 4, the EEPROM 70 memory also includes a third memory area which composes the third tier of an executable event. For example, when the address location of the EEPROM 70 corresponding to the current time contains zone and schedule data, (first tier data) the program in EPROM 62 (described in detail in connection with FIGS. 5a-j) combines the zone and schedule data from the combination of the first and second tiers with the zone and schedule data in the third tier of the EEPROM memory 70 in order to create event data which is the combination of the first, second and third tiers of data in the EEPROM memory.

The third tier of the EEPROM memory 70 is a single address location which stores the zone and schedule data entered in the select mode described in connection with FIG. 1. Specifically, the select mode (mode five) provides an "override" feature which allows the clock user to override the selected zones or schedules indicated by the data from the combined first and second tiers of the EEPROM memory.

Each time location in the first tier of memory includes four bits of zone data ($A_1$) and four bits of schedule data ($A_2$). Correspondingly, the one location in the third tier of memory includes four bits of zone data ($B_1$) and four bits of schedule data ($B_2$). In the second tier of memory four bits of zone data ($C_1$) are included. Since all the schedule information required for an executable event is contained in the first and third tiers, the second tier of memory does not include schedule data. It will be appreciated that the four bit length of the data in tiers one, two and three is only illustrative and any size of data block may be used if memory size permits. But it is necessary that the data block size be the same between tiers (e.g., $A_1$, $B_1$ and $C_1$ must have the same length), but zone and schedule data within the same tier need not be of the same length (e.g., $A_1$ may be of a different length than $A_2$).

To illustrate the formation of a complete event for execution, the three tiers of event data are combined in a fashion which can be characterized in Boolean Algebra as follows:

$A_1 \cdot B_1 \cdot C_1 = D_1$ $A_2 \cdot B_2 = D_2$

EXECUTABLE EVENT $= D_1, D_2$ wherein $D_1$ is the product of the logical ANDing of each bit in $A_1$ with each bit in $B_1$ and each bit in $C_1$. Similarly, $D_2$ is the product of the logical ANDing of each bit in $A_2$ with each bit in $B_2$. For example, the first bit in $A_1$ is combined with the first bit in $B_1$ and the first bit in $C_1$; the second bit in $A_1$ is combined with the second bit in $B_1$ and the second bit in $C_1$, etc. As a result, $D_1$ is a four bit data block representing the zones to be activated and $D_2$ is a four bit data block which identifies the selected schedule. By knowing the time and day of the event from the address locations associated with tiers one and two, an event can be executed in particular zones on a selected day and at a particular time. It should be noted that if no schedule is selected from the combination of schedule data $A_2$ and $B_2$ from tiers one and three, then no event occurs even if zones are selected from the combinations of data $A_1$, $B_1$ and $C_1$.

By providing an event storage structure in the EEPROM 70 as described herein, the necessity of separately storing the current time is eliminated. By eliminating the need to store the event time, the EEPROM memory can be minimized in size and the memory locations can be utilized for additional features of the clock system. In addition, the three tier structuring of an event allows the user of the clock 11 added flexibility and ease in programming in that each tier is separately and logically programmed.

An important aspect of the structure of the present programmable clock is the structure of the program memories which combine with the user interface elements of the front panel of FIG. 1 to comprise means for performing many of the functions described thus far. In order to describe the program structure, reference will be made to FIGS. 5a-5g which demonstrate the flow of program steps under control of memory 62.

FIGS. 5a-5j schematically show the conceptual operations, calculations and decisions necessary in order that the hardware of FIGS. 2a, 2b, 3 and 4 perform the foregoing functions of the programmable clock. In a well-known manner, each instructional step translates into an unchangeable binary set of codes compatible to a specific microprocessor. Upon the initial application of power, the program counter of the microprocessor is reset to the beginning address of the program memory area. The CPU 14 then begins execution of the instructions.

Program execution starts as step 100 by clearing the RAM 63 of the unit and initializing the output I/O lines to their correct values. The enter key 14 is then tested for closure at step 101. Depression of the enter key on the initial application of power invokes the display processing unit 60 to logically test the position of the keyswitch 25. If the keyswitch 25 at step 102 is in the program position, the microprocessor commences to erase the event data in the EEPROM 70 at step 103. Once complete, program execution continues at step 104.

At this point in the program, the unit 60 loads constants from the EEPROM 70 into the RAM 63 and the sixteen registers of the CPU 61. These constants are the duration times for the four zones, the twenty-four hour flag (a bit indicating whether the hours display should present time in a twenty-four hour or twelve-hour format), clock correction codes, and zone/schedule information. Moreover, the bit which indicates that the front panel display should flash is set. This visual indicator informs the user of the previous loss of power, in which case the proper time should be set by the user. Further initialization of the system occurs in step 71. Specifically, the current time is set to 12:00 AM and the current day is set to Monday. (The days of the week are each associated with a number one to seven, i.e, Monday equals one, Tuesday equals two, Wednesday equals three, etc.) These initialized values for time and day are placed in the RAM 63 for future reference. The software now instructs the CPU 61 to move to step 105.

In step 105 the program determines whether the keyswitch 25 is in the "run" or "program" position. If the input bit representing the position of the keyswitch 25 is clear, indicating the key is in the "run" position, the memory location indicating the current mode status is loaded with a six in step 106. Alternatively, if the keyswitch 25 is in the "program" position, step 107 sets the current mode status to one. Regardless of whether the mode is set to one or six, the program moves to the mode assembly subroutine of FIG. 5i from either steps 106 or 107. In the mode assembly subroutine, to be described in detail hereinafter, front panel 13 of the clock 11 is set to a display format appropriate for the selected mode. Once execution of the mode assembly subroutine finishes, the program jumps to step 108 of the program.

In step 108, the program initializes and starts a software timer. The timer accurately accumulates pulses at a 60 hertz frequency from the 60 hertz time base 78 in FIG. 2a.

In step 109 the program loads the preset correction codes for secondary clocks from the system memory onto the lines of the sync drivers 76. At step 110, the program displays to the user the data initialized in the subroutine of FIG. 5i. In order to display the data the digital information in the RAM 63 is sent from the CPU 61 via the bi-directional data bus 66 to the display drivers 71 and 72. From step 110, the program moves to step 111 where the time accumulated in the software timer is tested for an overflow condition i.e., 0.5 seconds.

In the case where the timer has overflown, the program branches to node A in FIG. 5f as will be explained in greater detail hereinafter. Alternatively, the program branches to step 112 wherein an indicator flag (a "fast" flag) is tested to determine whether a key closure has lasted longer than an ordinary key depression. The absence of the active status on the "fast" flag produces a program jump to node B in FIG. 5d. If the flag is set, a key closure has lasted longer than an ordinary key depression and the program must determine the present mode of the clock 11 before executing a function. Therefore, the program branches to step 113 wherein a determination is made whether the current mode equals four. If the mode equals four, the program branches to node C in FIG. 5b. Otherwise, the program proceeds to step 114 wherein a determination is made whether the current mode equals one. If the mode equals one, the program branches to node D in FIG. 5j. If the mode is not equal to one the program continues on to step 115 wherein a test is conducted to sense the closure of the enter key 14. If the enter key 14 has not been pressed, then the program branches to node D in FIG. 5j. If the enter key 14 has been pressed, the program branches to node E in FIG. 5j.

Nodes D and E, connecting FIG. 5a to FIG. 5j, illustrate the steps involved in the "bulk programming" feature of the system. The "bulk programming" feature is effective when the user presses both the enter key 14 and either the forward or reverse key 31 when the clock 11 is in mode three. For example, if the forward key 31 and enter key 14 remain pressed, the clock 11 enters the displayed schedule and zone event data into successive address locations as the displayed time is incremented by the forward key. The "bulk programming" feature will be explained in greater detail in connection with FIG. 5j.

Figure 5A:
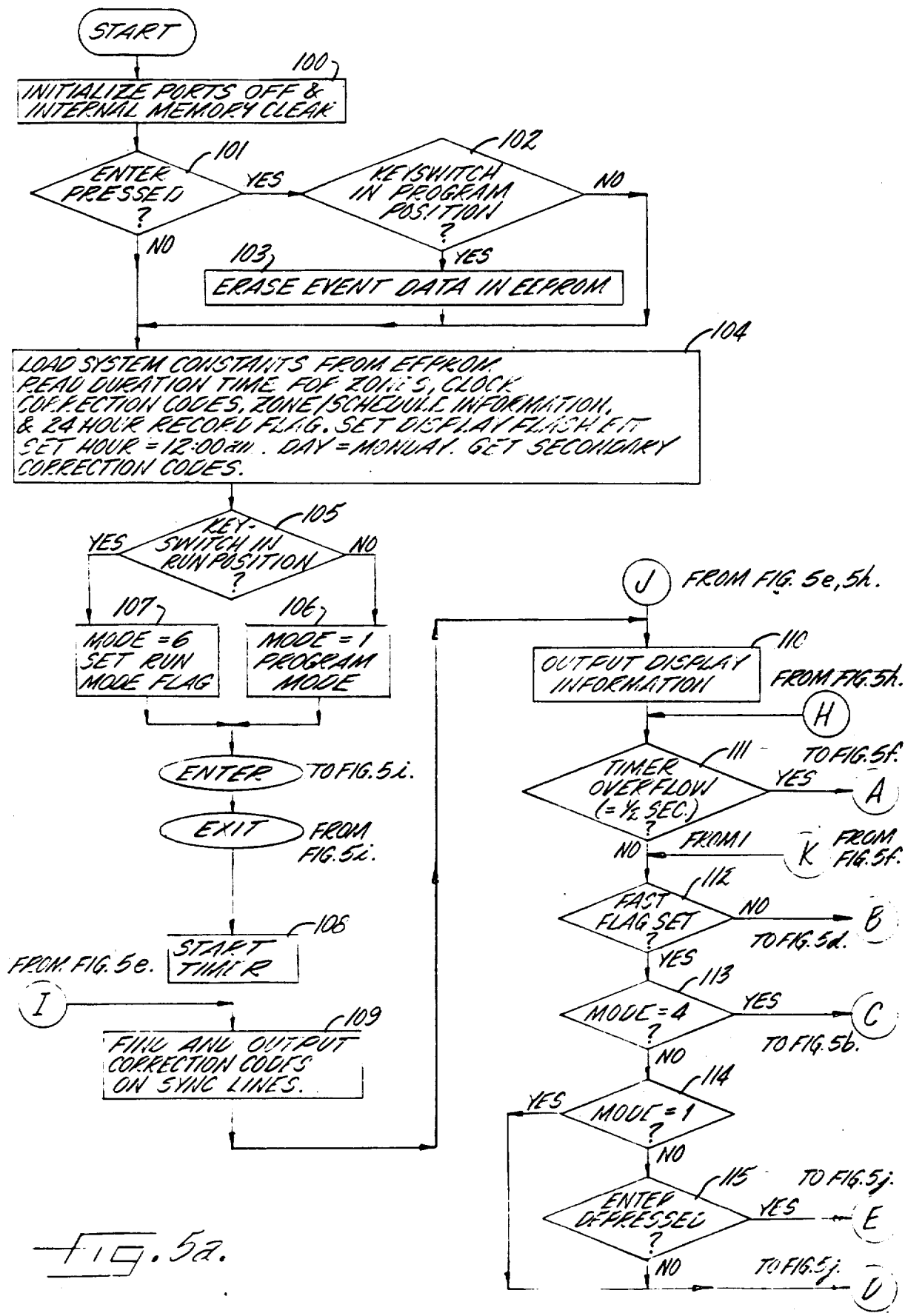

Referring to node C in FIG. 5b, the node is entered from step 113 of FIG. 5a if the mode equals four and the "fast" flag is set. Node C begins with step 116 wherein a determination is made whether the "fast" flag equals zero. If the "fast" flag equals zero, the program branches to step 117 wherein a "fo" flag is set which is used as a status indicator as will be apparent from the following description. Since a prolonged pressing of the forward or reverse key 31 is interpreted differently by different modes, it is necessary for the program to determine which mode is the current mode. Therefore, in step 118 the software determines if the mode is greater than five and less than nine. If the mode number is between five and nine, the program branches to step 119 wherein a determination is made whether the mode number is either five or six. If the mode number is either five or six, the program branches to node B in FIG. 5d. Alternatively, if the mode is not equal to five or six, the program branches to step 120 wherein a determination is made whether the mode is equal to seven. If the mode equals seven, then the program branches to step 121. Alternatively, if the mode does not equal seven, the program branches to step 122.

If in step 120, the mode does not equal seven, the mode must equal eight because of the process of elimination. At step 122, the "fo" flag is checked to determine if it is the forward key 31 which is being held pressed. If the flag is set (i.e., the reverse key is pressed), the time is decremented in step 162; otherwise, the time is incremented in step 163. Steps 122, 162 and 163 affect a change in the value of the duration information displayed by the time display 15. In order to indicate that a new duration is being displayed, step 164 begins the flashing of the LED. In step 165, a check is made to determine whether the mode equals nine. If the mode does not equal nine, the program branches to step 166. Alternatively, if the mode equals nine, the program moves to step 167 wherein the correction code table number is transferred from the EEPROM 70 into the RAM 63. Since the table number in the display has been changed from the action of steps 162 or 163 the limit check occurs in step 168.

If in step 168 the table number is greater than 20, the table number is reset to zero in step 169. On the other hand, if the table number is less than twenty, the program begins execution at step 166 by blanking the storage area of RAM 63 reserved for displaying hours. From step 166 the program branches to node B in FIG. 5d (i.e., step 170 of the program).

A determination that the mode equals seven in step 120 moves the program to step 121. From step 121, the program loads the day number from the RAM 63 and checks in step 154 for which key (i.e., the forward or reverse key 31) the user has pressed. If the "fo" flag is set, it indicates that the reverse key 31 has been pressed and as a consequence the program moves to step 155 where the day is decremented by one. In contrast, if the flag has not been set in step 154, the forward key 31 has been activated and the program branches to step 156 wherein the day is incremented by one.

Steps 157, 158, 159 and 160 perform limit checks on the value of the day in order to prevent the incrementing or the decrementing of the day from exceeding the range of one through seven which correspond to the seven days of the week. Once the day has been incremented or decremented and checked so that it has not exceeded its limits, the value is stored into the EEPROM 70 at step 161 for future reference. The program now enters node B.

Figure 5C:
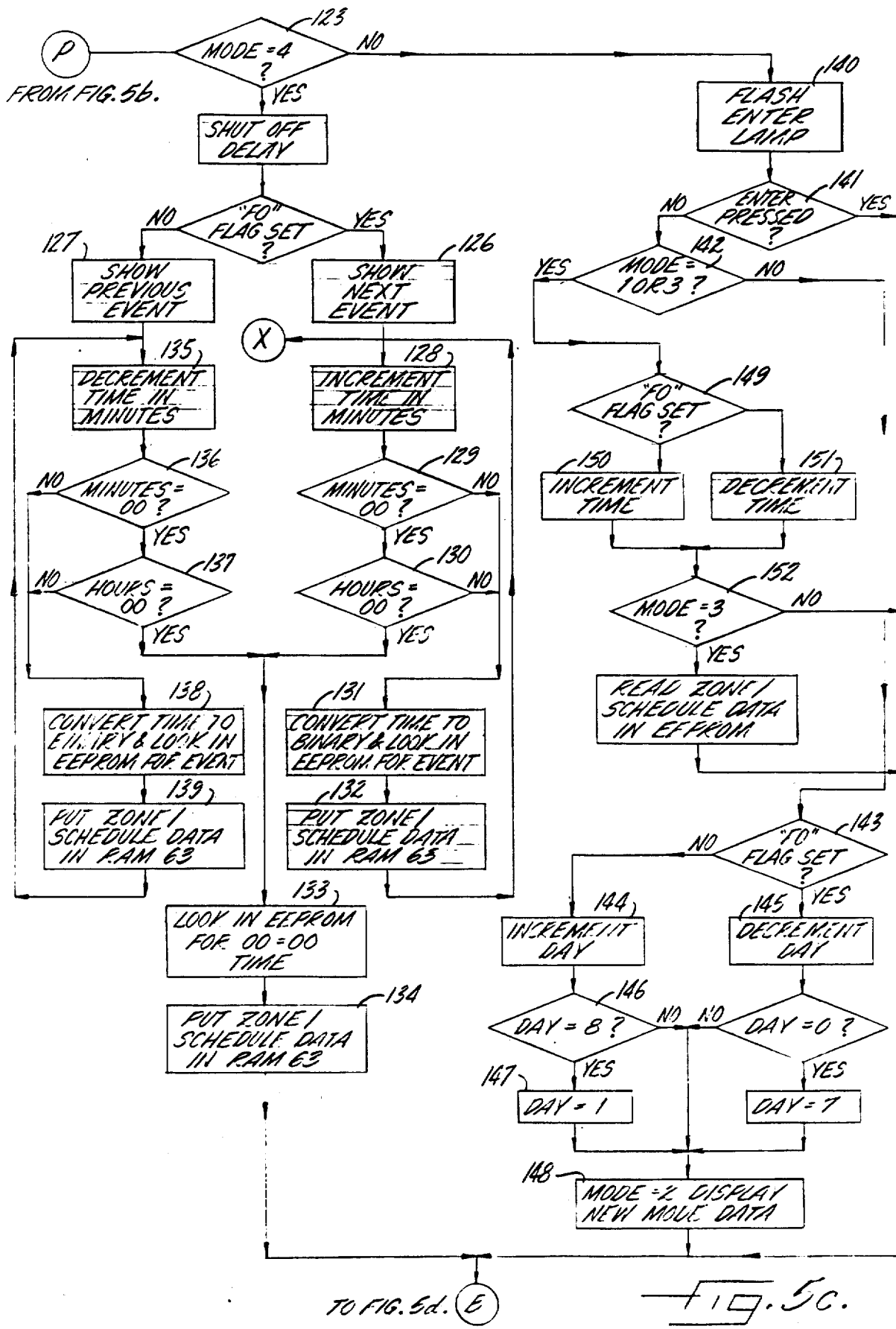

Returning to step 118, if the mode number is less than five then the program branches to step 123 in FIG. 5c wherein a determination is made whether the mode equals four. If the mode equals four, the program enters the edit routine at step 125, by way of step 124. At step 124, the display is blanked. At step 125, the program checks the status of the "fo" flag to determine if the user wants to see either the next scheduled event or the previously scheduled event with respect to the event time currently displayed. If the forward key 31 is detected as being pressed in step 125, the program branches to step 126 wherein the display of the front panel 13 is activated to show the next event. Alternatively, if the reverse key 31 is pressed, the program branches from step 125 to step 127 wherein the previous event is displayed.

From step 126 the program moves to step 128 which increments the real time. If the displayed time then equals 12:00 AM (00:00 in twenty-four hour format), then the program branches from step 129 to step 130; otherwise, the program moves to step 131. In step 131, the program converts the event time to a binary code so as to address the EEPROM 70 at the appropriate location. The data at the location identified by the binary code is transferred into the RAM 63 in step 132. If in step 130, the hours are equal to zero, the program branches to step 133 which transfers the event data stored at the 12:00 AM address location in the EEPROM 70 into the RAM 63 in step 134. From step 134 the program moves to node B.

Referring back to step 125 in FIG. 5c, if the reverse key 31 has been pressed instead of the forward key the program branches to step 127 as previously discussed. From step 127, the program moves to step 135 wherein the event time is decremented in minutes. From step 135, the program moves to step 136 wherein a determination is made whether the time is equal to 00:00. If the time is equal to 00:00, the program branches to step 137 wherein a determination is made whether the hours are equal to zero. Alternatively, in step 136 if the time is non-zero, the program branches to steps 138 and 139 which convert the event time to a binary code address for the EEPROM 70 and move the data identified by the address of the EEPROM 70 to the RAM 63. In order to get the next previous event, the program moves from step 139 back to step 135 wherein the event time is again decremented by one minute. By decrementing the time by one minute, the binary code converted from the real time is also decremented so as to provide an address for the next location in EEPROM memory. The process continues until the time is equal to 00:00. When this occurs, the program will branch from step 137 to step 133 and 134 where the last EEPROM data location (i.e., the address for 00:00 time) will be transferred to the RAM 63. From step 134, the program will then move to node B.

Referring back to step 123 in FIG. 5c, if a determination is made that the mode does not equal four, then the program moves to step 140 wherein the LED associated with the enter key 14 is flashed so as to indicate the displayed event has not been entered into the EEPROM 70. From step 140 the program moves to step 141 in order to examine the status of the enter key 14. If the enter key 14 is pressed, the program moves to node B. Alternatively, if the enter key has not been pressed, the program moves to step 142 wherein a determination is made whether the mode equals one or three.

If in step 142 the mode is determined to not equal either one or three, then by a process of elimination it must equal two. Therefore, in step 143 the program enters a day-of-week setting routine for mode two. As discussed in connection with FIG. 1, when the clock is in the day mode (i.e, mode two) the time display 15 is blanked and the most rightward digit of the time display shows a number between one and seven which corresponds to a day of the week. The forward and reverse keys 31 increment the displayed digit. If the forward key 31 is pressed, the program branches to step 144 wherein the displayed digit is incremented.

Alternatively, if the forward key 31 is not pressed, the program branches to step 145 where the displayed digit is decremented. (Each day is associated with a particular number one through seven, e.g, Monday equals one, Tuesday equals two, Wednesday equals three, etc.) In step 146, the value of the digit is investigated in order to determine if its value has exceeded its bounds. If it has exceeded its bound, the program moves from step 146 to step 147 where the digit is reset to a value of one. If in step 146 the day does not exceed a value of seven, the program branches to step 148 which loads the active zone/schedule information from the EEPROM 70 for that day into the RAM 63. From step 148, the program moves to node B.

Referring back to step 142 in FIG. 5c, if the mode equals one or three, the program branches to step 149 where a determination is made whether the "fo" flag is set. If the flag is not set, the program moves to step 150 where the displayed time is incremented. Alternatively, if the flag is set, the program branches to step 151 where the displayed time is decremented. In either case, both steps 150 and 151 move to step 152 wherein a determination is made whether the mode equals three. If the mode equals three, the zone and schedule information stored in the EEPROM memory at an address location corresponding to the current time is transferred to the RAM 63. From step 153, or from step 152 if the mode does not equal three, the program moves to node B.

Referring now to FIG. 5d, node B is the joining point for many of the steps in the program. In step 170 the position of the keyswitch 25 is read in order to determine whether the clock 11 is to be placed in the run mode or one of the program modes. When the value of the "keyswitch" flag is a logical high, the key 25 is in the "program" position. Accordingly, if the "keyswitch" flag is a logical low, the key 25 is in a "run" position. From step 170, the program moves to step 171 wherein the "run" flag bit is polled in order to determine if this is the first program cycle in which the keyswitch is in the "run" position. If the "run" flag is set, then the program branches to step 172. If the "run" flag is not set in step 171, the program branches to step 173 wherein the position of the keyswitch 25 is checked for a "run" or "program" position. If the keyswitch 25 is in a "program" position, the mode is set to one in step 174. Alternatively, if the keyswitch 25 is in a "run" position, the mode is set to a value of six in step 175. From steps 174 and 175, the program moves to step 176 which calls the routine of FIG. 5i. (As explained in greater detail hereinafter, the routine of FIG. 5i initializes the clock system with proper variables in accordance with the selected mode number.) After returning from the subroutine in FIG. 5i at step 173 in FIG. 5d, the program moves to step 173.

Step 173 takes the information in internal register sixteen and utilizes it to multiplex the displays of the front panel 13. From step 173, the program moves to step 174 where keys on the front panel 13 are scanned to determine if any have been pressed. If in step 174 it is determined that a key has been pressed, the program then branches to step 275 to check if the enter key 14 has also been pressed. If the enter key 14 has been pressed, the program branches to node H where the program branches back to step 111 in FIG. 5a. Referring back to step 174, if the keys on the front panel 13 are inactive, the program branches to 176 to determine if the "switch" flag is set, i.e., has a key been previously pressed. If a key has not been previously pressed in step 176, the program will branch to step 177; otherwise, the program moves from step 176 to step 178 wherein the "fast" and "switch" flags are reset. From step 178 the program moves to step 179 wherein the state of the mode is determined. If the mode equals six, the zone drivers 75 are reset at step 180. From step 180, the program returns to step 111 in FIG. 5a by way of node A.

If the "switch" flag is not set in step 176, the program moves to step 177 which provides a software delay to avoid a false detection of a keystroke on the enter key 14. From step 177, the program moves to step 181 wherein the status of the enter key 14 is checked. At this point in the program a determination is made as to which of the enter functions the user wishes to execute. If the enter key 14 remains untouched in step 181, the program moves to step 182 where the zone drivers 75 are reset. From step 182 the program moves to node N which branches the program to FIG. 5h.

Figure 5E:
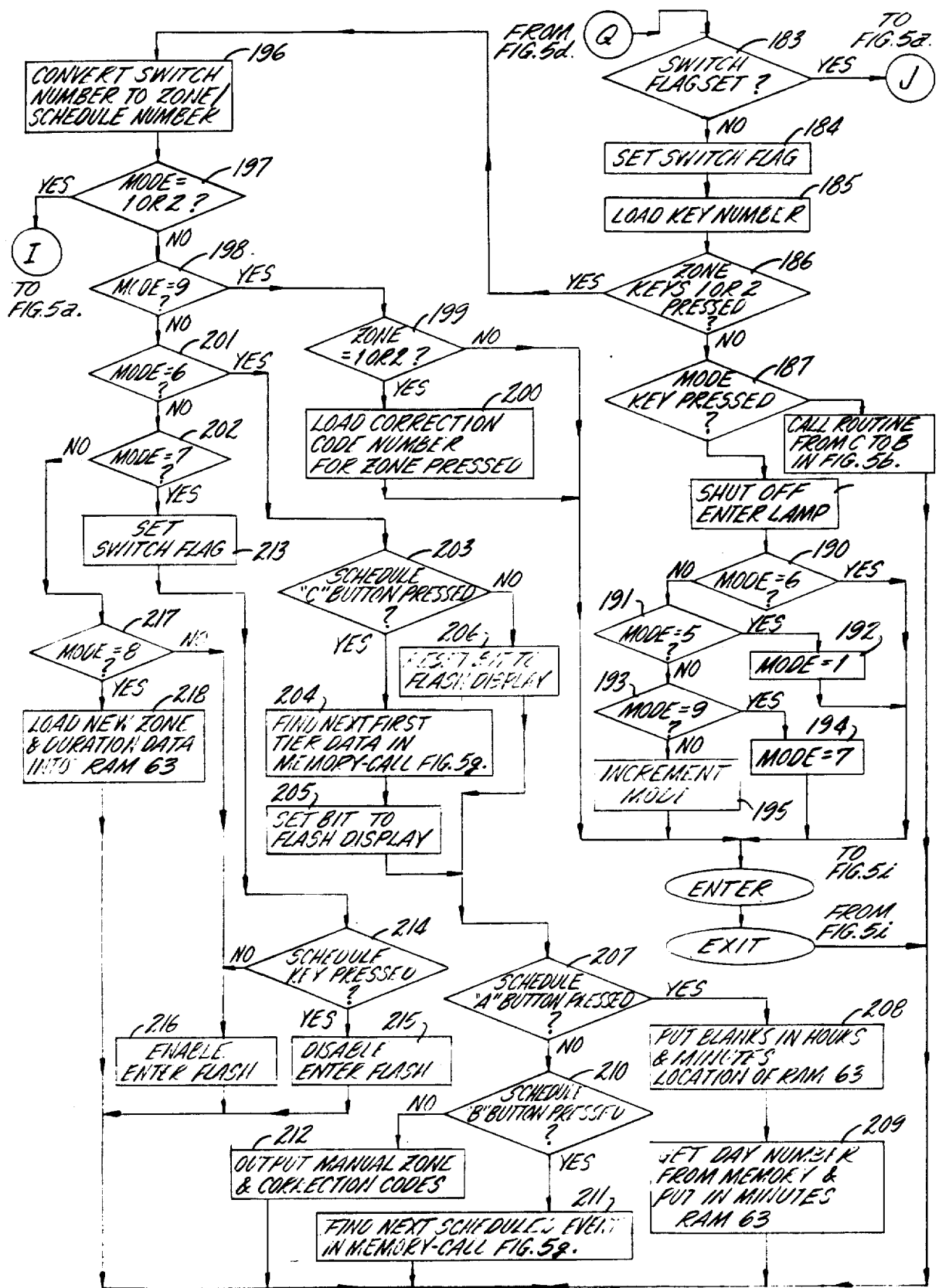

Referring back to step 175 in FIG. 5d, if the enter key 14 is not pressed, the program moves to step 183 in FIG. 5e wherein the "switch" flag is polled, i.e., a determination is made whether any keys are pressed. If no keys are determined to have been pressed, the program goes to node J which loops the program back to step 110 in FIG. 5a. The program will continue in this loop as long as no key closure occurs.

When a valid key closure occurs, the program will branch to step 184 which toggles the "switch" flag thereby telling the processor a key closure has occurred. A number representing the particular key, which is generated by switch encoder 67, is loaded into the RAM 63 at step 185. Since it has previously been determined that a key closure has occurred (at step 183), step 186 examines if either the one or two keys of the zone keys 21 is pressed. If neither of these keys have been pressed, the program branches to step 187 wherein it is determined whether the mode key 27 has been pressed. If the mode key 27 has not been pressed, the program branches to step 188 wherein a subroutine comprising the program steps in FIGS. 5b and 5c is called. Upon returning to step 188, the program moves to node I.

If it is determined in step 187 that the mode key 27 is pressed, the program knows that the user wishes to increment the mode number. As a result, the next few steps in the program perform the functions necessary in order to cycle the mode display 24. The first phase of cycling the display involves the extinguishing of the enter LED on the front panel 13 in step 189. From step 189, the program proceeds to step 190 wherein the present mode is compared with the mode number six. If this comparison fails, the program branches to step 191. If the comparison is successful, the program branches to the subroutine of FIG. 5i. If the present mode is equal to five then the comparison in step 191 causes the program to branch to step 192 where the mode is reset to one. On the other hand, if the present mode is not equal to five, the program advances to step 193 wherein the present mode is checked for a value of nine. If the mode is equal to nine in step 193, the program branches to step 194 wherein the mode is reset to seven. Alternatively, if the mode is not equal to five or nine in steps 191 and 193, respectively, the mode value is incremented by one in step 195. From step 195, the program progresses to the subroutine of FIG. 5i. From the subroutine of FIG. 5i, the program returns to step 109 in FIG. 5a by way of node I.

The functions provided by the one and two keys of the zone keys 21 are directly related to the particular mode of the clock. Therefore, if the zone keys 21 are active, it is important to determine which mode the clock is in. Accordingly, digressing back to step 186 in FIG. 5e, if the zone one or two keys are pressed the program branches to step 196 wherein the pressed keys are transformed into binary-coded zone numbers. From step 196 the program advances to step 197 wherein the present mode is tested to equal one or two. If the mode equals one or two, the program branches back to step 109 in FIG. 5a by way of node I.

When neither of these modes are the present mode, the program moves to step 198 in order to determine if the present mode equals nine. If the present mode equals nine, the program moves to step 199 to check whether the first or second zone keys 21 are pressed. In mode nine, detection that either the first or second zone keys 21 has been pressed indicates the user wishes to set the correction codes for the secondary clocks. If either the first or second zone keys 21 is pressed, the program moves to step 200 wherein the correction code numbers are loaded into the RAM 63. From step 200, or from step 199 if neither the first nor second zone key 21 has been pressed, the program progresses to the subroutine of FIG. 5i to initialize the system for operation in mode nine. From the subroutine of FIG. 5i, the program returns to step 109 in FIG. 5a by way of node I.

If in step 198 the present mode is not equal to nine, the program branches to step 201 wherein the present mode is checked for a value of six. If the mode is not equal to six in step 201, the program will continue to determine the value of the present mode at step 202. If the clock 11 is in the run mode (i.e, mode six), the keys on the front panel 13 are associated with functions which are distinct from the functions associated with the same keys when the clock is in one of the program modes. Therefore, when a determination is made in step 201 that the clock is in mode six, the program moves to step 203 to determine whether the "C" key of the schedule keys 23 has been pressed. If the "C" key has been pressed, the program moves to step 204 wherein the next scheduled event data in the 1440 locations of the first tier of event data in the EEPROM memory 70 is loaded into the RAM 63. To implement step 204, a subroutine call is placed to node T in FIG. 5g in order to increment the time until the next event data is found.

Once the next address having event data is located, the address is coded into BCD format and displayed as time on the time display 15. To complete the display on the front panel 13, the zone and schedule data at the address of the EEPROM 70, is displayed by the LEDs 17 and 19, respectively. The program sets the hardware bit which flashes the display in step 205 in order to alert the user that the displayed event is the next event data in the first tier of event data and that the data is displayed in response to a keystroke to the "C" key of the schedule keys 23.

The foregoing steps encompass the steps necessary to enter the clock into the test function of the run mode, i.e., mode six. Had the "C" key not been pressed, the program would branch from step 203 to step 206 wherein the hardware flash bit would be reset. Thus, closure of any zone key 21 or schedule key 23 (other than the "C" key) will cause the clock 11 to leave the test mode. From steps 205 and 206, the program moves to step 207 wherein the schedule "A" key of the schedule keys 23 is tested for a keystroke.

A keystroke to the "A" key while the clock 11 is in the run mode will cause the time display 15 to display the number corresponding to the current day. Therefore, steps 208 and 209 accomplish this by loading the day number from the internal register sixteen and placing the number in the minutes location of the RAM 63. From step 209, the program returns to step 109 in FIG. 5a by way of node I.

If the schedule "A" key is not pressed, the program branches from step 207 to step 210 and checks if the user has pressed the "B" key of schedule keys 23. If the "B" key has been pressed, the time display 15 will display the time of the next scheduled event as well as the zones which will be activated. In order to provide for such a display, step 211 loads the above-mentioned information from the EEPROM 70 into the RAM 63 of the clock 11 in the same manner as described in connection with step 204. From step 211, the program returns to step 109 in FIG. 5a by way of node I.

If in step 210 it is determined that the "B" key has not been pressed, then the choice of keys which may be pressed has been narrowed to the zone keys. If one of the zone keys is pressed while the clock 11 is in the run mode, the clock will signal the zone driver 75 to activate the respective zone line. Accordingly, step 212 accomplishes this feat. From step 212 the program returns to step 109 in FIG. 5a by way of node I.

Referring back to step 202 in FIG. 5e, if the clock 11 is not in the run mode, the program checks for mode seven. If the present mode equals seven, the program proceeds to step 213 wherein the binary code of any key currently closed is loaded into the display processing unit 60 from the switch encoder 67. From step 213, the program advances to step 214 wherein a determination is made whether any of the schedule keys 23 have been pressed. If in step 214 a determination is made that one of the schedule keys 23 has been pressed, the program branches to step 215 where the hardware flash bit for the enter LED is disabled. The lack of a closure of a schedule key 23 in step 214 enables the bit which flashes the enter LED in step 216. Both steps 215 and 216 return the program to step 109 in FIG. 5a by way of node I. Thus, the enter LED begins to flash after one of the schedule keys 23 has been pressed while the clock is in the day/zone programming mode, i.e., mode seven. The flashing enter LED prompts the user to press the enter key 14 in order to permanently store the newly loaded data into the EEPROM 70.

If the conclusion of step 202 had been the current mode does not equal seven, the program moves to step 217 where the present mode would be tested for a value of eight. If the current mode is equal to eight, then the program branches to step 218 wherein the duration information for a selected zone (stored in the EEPROM 70) is moved into the RAM 63 for a visual indication on the front panel 13 of the duration time for each zone. If the final test for the mode number in step 217 fails, the program branches to step 216 which enables the enter LED bit so as to cause the LED to flash on the front panel 13.

Digressing momentarily to step 111 in FIG. 5a, when the timer of the microprocessor indicates that more than 0.5 seconds have elapsed since step 108. the program branches from step 111 to step 400 in FIG. 5f by way of node A. In the steps of FIG. 5f, real time is updated in the internal registers of the CPU 61 and, if the clock is in the run mode, an event is executed if an event has been entered for the displayed time. In step 400 of FIG. 5f, the secondary clocks driven by way of the sync driver 76 are updated if appropriate. In step 401, the seconds, minutes and hours data are updated in the internal registers of the CPU 61. From step 401, the program determines at step 402 whether the current mode is the run mode. If the current mode is the run mode, the program moves to steps 403 to 407 in order to execute the event which may be stored at the displayed time.

At step 403, the program identifies the first tier data address in EEPROM 70 that corresponds to the displayed time in binary code. In step 404, the program determines if the first tier schedule data matches with the current schedule data, i.e., the third tier schedule data. If a match exists at step 404, the program moves to step 405 wherein a determination is made if any zones are active. If zones are active, the program combines the zone data from the first, second and third tiers in step 407. If a match is not found in steps 404 or if no zones are active in step 405, the program branches to step 409 wherein the zone lines of the zone driver 75 are deactivated.

From a negative decision in step 402 or 404–407 the program determines if the current seconds equals the end of a zone duration at step 408. If it does equal the end of a duration, the program deactivates the appropriate zone output line of the zone driver 75 at step 409. From step 408, the program moves to step 410 if no end of duration is indicated. At step 410, the appropriate zone lines of the zone driver 75 identified in steps 403–407 are activated. From steps 409 or 410, the program returns to step 112 in FIG. 5a by way of node K.

Referring now to FIG. 5g, the match subroutine called in steps 204 and 211 of FIG. 5e consists of a series of steps which identify the first address location in the first tier of the EEPROM 70 where event data is stored which corresponds to the selected schedule. Specifically, step 411 calls the steps from node X to node B in FIG. 5e in order to (1) convert the BCD time to a binary address for the first tier of event data in EEPROM 70 and (2) increment or decrement the address if data is not found. From step 411, the program determines at step 412 if a match exists between the schedule data of the first tier and the currently selected schedule (i.e., third tier schedule data). If no match exists, the program returns to step 411 in order to increment or decrement the memory address. If a match is found in step 412, the program determines if any zones are active at step 413. If active zones are found, the subroutine exists back to steps 204 or 211; otherwise, the subroutine returns to step 411 in order to continue searching for the next event data.

Figure 5H:
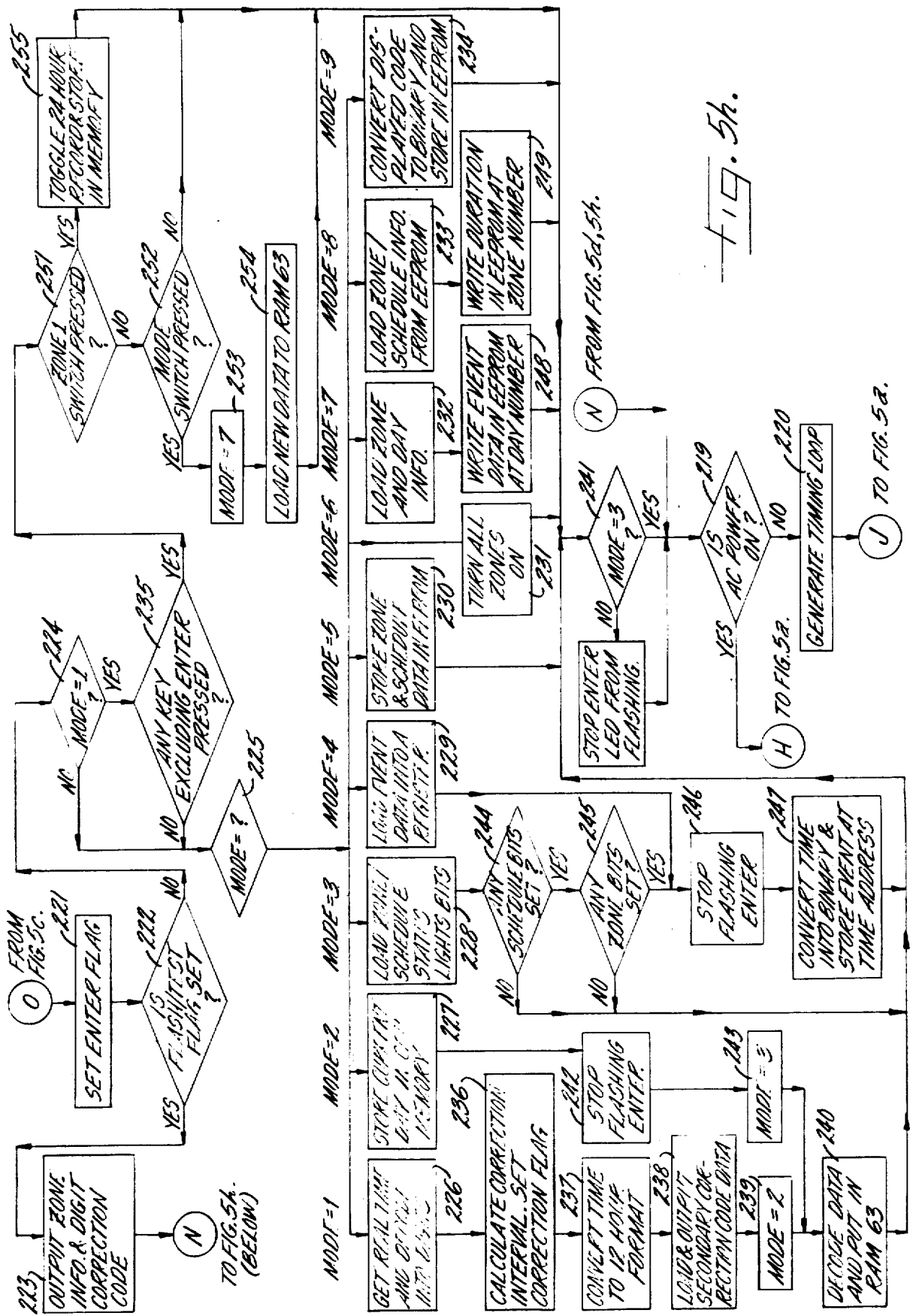

Referring to FIG. 5h, node N is a continuation of the program from step 182 in FIG. 5d. The first step from node N transfers the program from step 181 to step 219 which checks to see if a "sixty-hertz" flag is present thereby indicating the presence of a-c power. If a-c power is present, the program returns to step 111 in FIG. 5a by way of node H. If a-c power is not present, the battery backup is powering the clock. If the battery backup is powering the clock 11, a sixty-hertz signal is not available to serve as the time base 78 in FIG. 2. Therefore, the software generates the time base through a series of delay loops in step 220. From step 220, the program returns to step 110 in FIG. 5a by way of node J.

Node O is the major node entering into the steps of FIG. 5h. From step 181 in FIG. 5d, the program branches to step 221 in FIG. 5h wherein the "enter key" flag is activated since the enter key 14 has been pushed as determined in step 181 in FIG. 5d. From step 221, the program moves to step 222 where the "flash/test" flag is polled to determine if it is set. If it is set, the program moves to step 223 where the digital correction code is loaded. From step 223 the program jumps to node N.

If the "flash/test" flag is not set in step 222, the program branches to step 224 wherein a test is conducted to determine if the present mode equals one. If the mode does not equal one, the program moves to step 225 which moves the program to the appropriate one of steps 226-234 as explained hereafter. If the mode is found to equal one in step 224, the program branches to step 235 wherein the "switch" flag is tested. If the "switch" flag is not set (i.e., a key has not been pressed) the program branches to step 225.

The first step of the mode one routine from step 225 is step 226 which results in the CPU 61 coding the time into a BCD format for display by the time display 15. At step 226, the BCD time is transferred from the internal registers of the CPU 61 to the RAM 63. From step 226, the program moves to step 236 where the updating necessary for the secondary clocks is calculated. At step 237, the current time is converted into a twelve-hour format. At step 238, the secondary clocks are updated by way of the sync driver 76 if step 236 indicates an update is necessary. In step 239, the current mode is incremented to two since the clock automatically moves to mode two after the enter key 14 has been pressed in mode one. Time data in BCD format from the display 15 is decoded to seven-segment format in step 240 and stored in RAM 63. From step 240, the program moves to step 241.

Referring now to the mode two routine which starts at step 227, the current day number is first stored into the RAM 63 from internal register sixteen. The software extinguishes the bit flashing the enter LED at step 242 since the enter key 14 has been pressed at the end of mode one. At step 243 the mode is incremented to a value of three. From step 243 the program merges into the mode one subroutine at step 240 where the BCD value for the day is decoded to a seven-segment format and stored in RAM 63.

If in step 225 the mode is determined to be equal to three, the program jumps to step 228 for the mode three subroutine. In step 228 the zone and schedule data from the first tier of EEPROM 70 and at an address corresponding to the displayed time are loaded into the RAM 63. The program moves from step 228 to step 244 wherein a test is conducted for any schedule data bits which are set. If no schedule data bits are set, the subroutine branches forward to step 241 since no information is present to store into the EEPROM 70. If a schedule key 23 has been pressed, the program branches from step 244 to step 245. If both zone and schedule data is present and the enter key 14 is pressed, the program will continue from step 245 to step 246 wherein the flashing LED is disabled in order to alert the user that new zone and schedule data has been permanently stored. In step 247 the present time is converted into a binary address in order to provide an address location for permanently storing the entered schedule/zone data into the first tier of event data of the EEPROM 70. From step 247, the program moves to step 241 to finish the subroutine.

When the clock 11 is in mode four, the event edit mode, the program moves from step 225 to step 229. In step 229, the event data stored at the address location of the EEPROM 70 corresponding to the displayed time is loaded into the RAM 63. From step 229, the program flows to steps 246 and 247 whose functions have been described earlier in connection with the mode three subroutine.

When the clock is in mode five (i.e., the select mode), the program jumps from step 225 to step 230 which begins the subroutine for mode five. Step 230 stores the zone and schedule information entered on the front panel 13 into the EEPROM 70. Thus, the zone and schedule data is entered into the second tier memory location of the EEPROM 70. From step 230 the program moves to step 241.

When the clock is in mode six (i.e., the run mode) in step 225 (and the enter key is pressed), the clock invokes a special function provided for at step 231 known as the "all-zone" function. In step 231 all of the output lines of the zone driver 75 are activated. Thus, while the enter key 14 is pressed in mode six, all of the output lines of the zone driver 75 will remain active. After activating the output lines of the zone driver 75 in step 231, the program moves to step 241.

If the clock is in mode seven, the program moves from step 225 to step 232 wherein (when the enter key is closed) the day/zone/schedule information, i.e., the third tier of event data, for a selected day is entered into the RAM 63 from the front panel 13 and then written into the EEPROM 70 at address representative of the day. Step 248 completes the entry of data started in step 232. From step 248, the program moves to step 241.

When the clock is in mode eight in step 225, the program moves to the mode eight subroutine at step 233. In step 233, the duration time for a selected zone is transferred from the front panel 13 to the RAM 63 and then, in step 249, it is put into the EEPROM 70 at an address representative of the zone number. Thus, duration data entered in mode eight is saved in the EEPROM 70 and the program advances to step 241.

When the enter key 14 is pressed while the clock 11 is in mode nine, the program branches from step 225 to step 234 wherein the displayed correction code is converted from BCD to binary and stored in EEPROM 70. From step 234 the program moves to step 241. Each of the steps or series of steps associated with the nine modes for storing data (or activating zones in the case of mode three, the run mode) after the enter key 14 has been pressed merge together at step 241. If the mode does not equal three in step 241, the program stops the enter LED from flashing at step 250. The enter LED was flashed until the enter key 14 was pressed in order to prompt the user that the display data is not in permanent memory until the enter key is pressed. From a determination that the mode equals three in step 241 or from step 250, the program moves to steps 219 and 220 which check for a-c power as previously discussed.

Referring back to step 235 in FIG. 5h, if the "switch" flag is active, the program branches to step 251 wherein the status of the left-most key of the zone key 21 is determined. The user can change the format of how the time is seen by simultaneously pressing the enter key 14 and the left-most key of the zone keys 21. If the user is pressing these two keys, the "twenty-four hour" flag complements and is kept in the CPU's registers in step 255. In effect, if the time was being presented in a twenty-four hour format, it is now presented in a twelve-hour format. The reverse is also true. From step 255 the program moves to step 219.

If the user chooses to press another key besides the left-most key of the zone keys 21 while simultaneously pressing the enter key 14, the program will branch to step 252. If the user presses the mode key 24, the program will branch to step 253. Alternatively, if the mode key 24 is not pressed the program will branch to node N or step 291. In step 252, if the mode key 24 is pressed and since the enter key 14 is pressed, the display is caused to change to mode seven at step 253. From step 253, the program moves to step 254 which loads the RAM 63 with the proper day information for displaying mode display 24. From step 254, the program branches to step 219.

FIG. 5i illustrates the steps necessary to reconfigure the clock 11 when a mode number change occurs. The calling of this subroutine occurs at several points in the program and it enters at step 300 and returns to the calling point at step 316. When the program enters this subroutine at step 300, the program transfers instruction execution onto a branch of the subroutine representative of the mode number, i.e., the CPU 61 calculates the address for the next step at step 300. For example, when the mode equals one, the CPU calculates the program address for step 301. At step 301, the zone and schedule lamps are extinguished. Continuing at step 302, the decoded time segments move into the RAM 63. The program then moves to step 316.

If the mode is equals two at step 300, the program moves to step 303. The CPU 61 reacts by loading the current day number from internal register sixteen and storing the number in the minutes location of the RAM 63, for displaying the day number on the time display 15. The program then jumps to step 315. In the case that the mode equals three, the program loads the RAM 63 at step 304 with data from the next first tier event location having data stored therein. Completing the program branch for mode three, the program moves to step 316.

For the mode equaling four, the program moves from step 300 to step 305 wherein the hours and minutes counters in the CPU's register are both reset to zero and the CPU searches the first tier of the EEPROM 70 for the next event data. By zeroing the hours and minutes, the first event data for the 24-hour period will be displayed first. The schedule, zone and time data are placed into the RAM 63 at step 306 for display on the front panel 13. From step 306, the program moves to step 316.

Step 300 branches to step 307 if the mode is determined to be equal to five. In step 307 the RAM 63 is blanked and the current zone and schedule data from the second tier of EEPROM 70 is displayed by the front panel 13.

For mode six the program jumps from step 300 to step 308. In step 308, the zone and schedule data from the second tier of the EEPROM 70 is moved into the RAM 63 for display on the front panel 13. The program then branches back to step 302.

The mode seven portion of the subroutine starts at step 309 in FIG. 5i. All of the front panel 13 is blanked, except for the mode display 24. At step 310 the day number is set to one and a BCD one is placed in the minutes location of the RAM 63 in order that a digit one may be displayed at the right-most minutes digit of the time display 15. The program continues at step 311 and 312 by locating the zone/schedule data for displayed day. This information is then input to the RAM 63 at step 313 for display by the LEDs 17 and 19 on the front panel 13. At step 315 both the AM and PM LEDs are extinguished. The program then exits back to the calling routine after completing step 316 which decodes the binary numbers in RAM 63 into respective seven-segment codes and adjusts the time for a twenty-four hour format if the "twenty-four hour" flag was set at step 255 in FIG. 5h.

For mode eight in the subroutine of FIG. 5i, the program jumps from step 300 to step 314. In this subroutine, the proper duration time for a selected zone key 21 is loaded into the minutes location of the RAM 63. In step 314, the time display 15 is blanked in order to remove the display of time and prepare for displaying zone duration in seconds. From step 314, the program moves to steps 317 and 318 wherein the binary coded duration time is converted to a BCD format for display by the time display 15. In step 319, the BCD value of the duration, for the selected zone, is loaded into the RAM 63. If a 24-hour time format was selected in step 255 of FIG. 5h, the program branches from step 320 to step 321 wherein the AM and PM LEDs are blanked. If a 12-hour format has been selected in step 255, the program branches from step 320 to step 322 wherein the appropriate AM or PM LED is activated and the time display 15 is adjusted for a 12-hour format. From either steps 321 or 322, the program moves to step 323 wherein the zone duration time in seven-segment format is output to the time display 15 from the RAM 63. Following step 323, the program loads the appropriate zone/schedule data from the EEPROM 70 into the RAM 63 at step 324. From step 324, the program activates the appropriate LEDs 17 and 19 from the data in RAM 63 in step 316. Also in step 316, the time display 15 is adjusted to a 24-hour format if the "24-hour" flag was set in step 255 of FIG. 5h.

If mode nine is the present mode at step 300, the program jumps to step 325 where the BCD time in minutes stored in the RAM 63 is blanked and the AM and PM LEDs 29 are shut off. The appropriate correction code for the secondary clocks is loaded from EEPROM 70 into the storage area of the RAM 63 vacated by the BCD minutes data. In step 326, following step 325, the appropriate data for LEDs 17 and 19 is loaded into RAM 63. Because time is not displayed in mode nine, the program shuts off the AM and PM LEDs 29 in step 321 after 326 is completed. For mode nine, the program moves through steps 323, 324 and 316 after step 321. Since these steps have been described in connection with mode eight, their functions will not be restated.

Figure 5J:
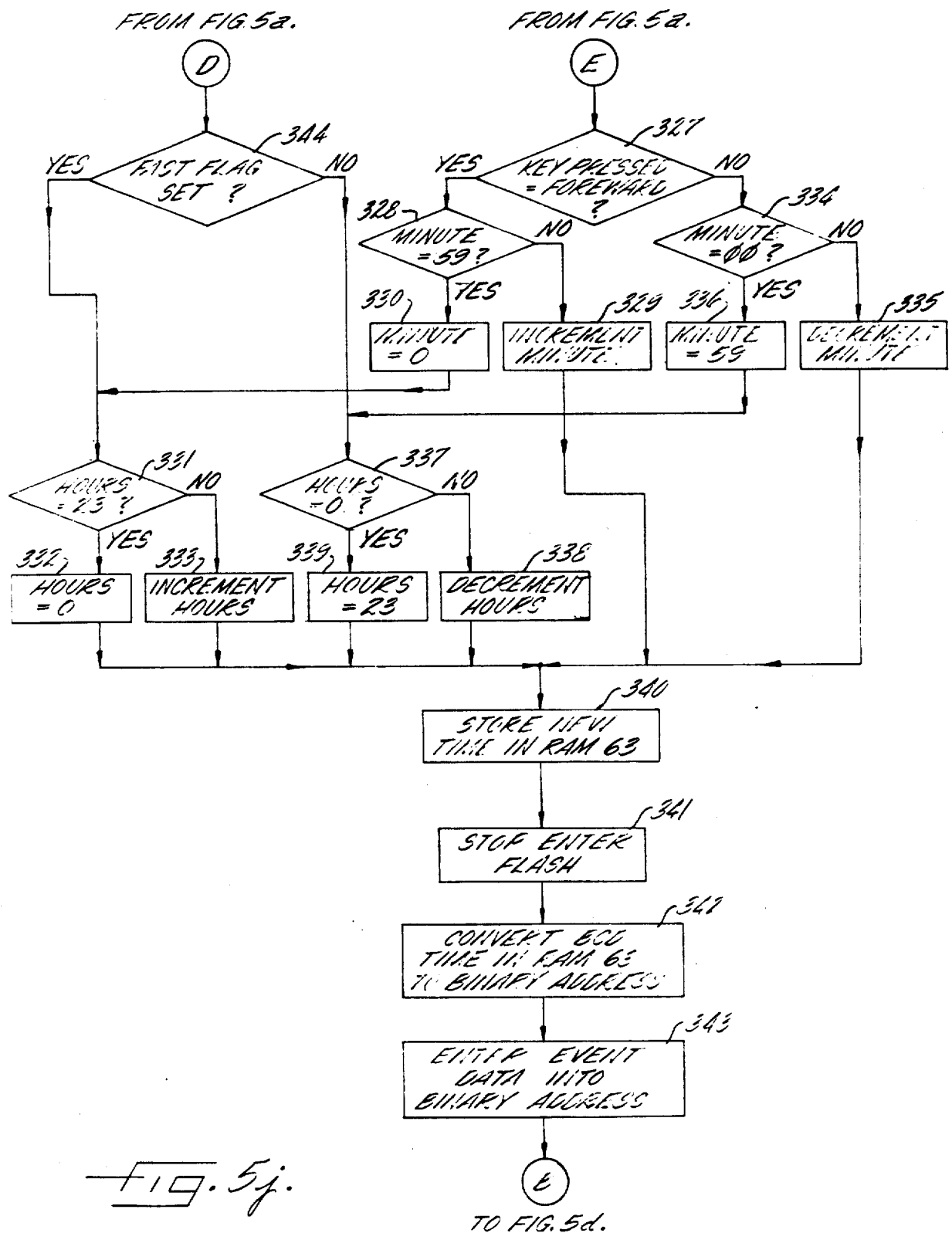

Referring to FIG. 5j, node D and E are branches of the program steps from FIG. 5a. Taking node E first, if the enter key 14 is pressed in step 115 of FIG. 5a, the program moves to step 327 in FIG. 5j. Assuming step 327 has a true condition, i.e., the forward key 31 is pressed, the program moves to step 328 wherein the program tests to determine if the minutes of the displayed time equals fifty-nine. If the displayed minutes is not equal to fifty-nine, the software moves to step 329 wherein the displayed minutes are incremented. If the displayed minutes equal fifty-nine in step 328, the program branches to step 330 wherein the minutes display of time display 15 is reset to "00". From step 330, the program moves to steps 331, 332 and 333 where the hour display of time display 15 is updated. First, in step 331, if the hour equals twenty-three, it is reset to zero in step 332. For any other value of the hour, the display is incremented by one at step 333.

If the reverse key 31 had been selected instead of the forward key, the test at step 327 would branch the program to steps 334, 335 and 336 in order to decrement the time display 15 instead of increment the time display. Specifically, the test at step 334 checks for the displayed minutes equaling zero. If the display is not equal to zero minutes, step 335 decrements the minute display by one. If the minute display has a value of zero, it is reset to a value of fifty-nine in the step 336 and the hour indicator is decremented in steps 337, 338 and 339. If the hour equals zero in step 337, it is reinitialized to twenty-three in step 339. A non-zero value for the hour causes the hour to decrement by one in step 338.

All of the foregoing steps described in connection with the incrementing or decrementing of the time display 15 lead to step 340 in the program. In step 340, the incremented or decremented time is stored in the RAM 63. From step 240, the program stops the enter LED from flashing at step 341. In step 342, the hours and minutes data stored in RAM 63 is converted from BCD format to a binary address which identifies one of the 1440 storage locations of the first tier of event data in the EEPROM 70. In step 343, the event data is entered into the EEPROM 70 at the address which was calculated from the event time in step 342. From the loading of the event into the EEPROM 70 in step 343, the program branches to node B in FIG. 5c. In mode three, when the enter key 14 and either the forward or reverse keys 31 are held pressed, the program will cycle through the steps of FIG. 5j from node E to node B thereby causing the clock 11 to implement the "bulk programming" feature described in connection with FIG. 1.

Still referring to FIG. 5j, node D at step 344 of the program checks for the setting of the "fo" flag. Node D is entered from a determination in step 115 of FIG. 5a that the enter key 14 is not pressed. In step 344, the "fo" flag represents a keystroke of the forward key 31. If the "fo" flag is set the forward key 31 is the key which is being pressed for a prolonged duration. (The "fast" flag was determined to be set in step 112 of FIG. 5a.) From step 344 the hour displayed by the time display 15 is decremented according to steps 331, 332 and 333. If at step 344 the "fo" flag is not set, the program branches to steps 337–339 wherein the displayed time is decremented.

I claim:

1. A user-programmable clock comprising in combination:

a processor means;

a plurality of keys for signaling said processor means;

a visual display for displaying information from the processor including locations for time, a plurality of active zone positions and a plurality of schedule positions;

an event memory having a plurality of tiers of data locations for storing event data, at least a first tier of said event memory having data locations identified by an address which corresponds to the time at which the event data in the location is to be executed, each data location including data for a plurality of active zones and schedules;

the processor including means for interpreting keystrokes on the keys and in response thereto entering information into the event memory at data locations identified by an address which corresponds to the time for executing the data;

means for locating the stored data in the tiers of the event memory with said locating means locating data in said first tier at the binary address location corresponding to a displayed time; and means responsive to said locating means for executing the stored data in the zones and schedules indicated by the information stored in the event memory.

2. The user-programmable clock as set out in claim 1 including means for combining each event location in said first tier of event memory with data from a second tier of event memory in order to provide a first executable event wherein said second tier includes data stored in said memory corresponding to the desired active zones for each day of the week.

3. The user-programmable clock as set out in claim 2 wherein said memory includes a third tier for combining with said first executable event with said third tier including data for overriding the selection of zones and selections made in said first executable event.

4. A user-programmable clock comprising in combination:

a processor means;

a plurality of keys for signaling the processor;

a visual display for displaying information from the processor including locations for time, a plurality of active zones and a plurality of active schedule positions;

an event memory having a plurality of data locations with said data locations divided into at least first and second tiers;

said first tier of the data locations including a plurality of zone and schedule data at addresses of the event memory which correspond to the time for executing the data;

said second tier of said data locations including zone data for each day of the week;

said processor including means for interpreting keystrokes on said keys and in response thereto entering information into said first tier of the data locations wherein the data locations of said first tier are identified by an address which corresponds to the time at which the data is to be executed;

means for locating data in the first tier of data locations at an address location corresponding to the present time;

means for locating data in the second tier of data locations at an address location corresponding to the present day;

means for combining the located data from the first and second tiers of data locations to form an event to be executed; and means responsive to the formation of an event to be executed for activating the zones indicated by the stored event.

5. A user-programmable clock as set forth in claim 4 wherein said memory includes:

a third tier of data locations with said third tier including zone and schedule data for overriding the event formed by combining the data of the first and second tiers; and means for combining the data in said third tier of data locations with the event formed by the combination of the data from said first and second tiers whereby the zone and schedule data of said third tier overrides the zone and schedule data formed by the combination of data from said first and second tiers.

6. A user-programmable clock as set forth in claim 4 wherein the first tier of data locations has data locations corresponding to every minute of the day.

7. A user-programmable clock as set forth in claim 4 wherein the first tier of data locations has addresses for the locations which correspond to each minute of a day and the second tier of data locations have addresses corresponding to each day of a week.

8. A user-programmable clock for executing events defined by functions executed at a particular time in selected zones and for selected schedules, said clock comprising in combination:

a processor means including timing means for providing timing data;

a keyboard means for signaling said processor means;

an event memory for receiving zone and schedule data from said keyboard means by way of said processor means wherein said event memory is segregated into at least first and second tiers of data wherein at least said first tier has a plurality of event locations;

said processor means responsive to said keyboard means to route data entered from said keyboard means to one of the two tiers in said event memory;

means for selecting data stored in the first and second tiers of said event memory wherein said first tier data is selected from address locations corresponding to the timing data from said timing means;

means for combining data selected from said first and second tiers of said event memory whereby selected zones and schedules are indicated for execution at a time corresponding to the address of the first tier data; and means for executing a function in response to the combined data received from said combining means in the selected zones and for the selected schedules at the time corresponding to the address location of the first tier of data.

9. A user-programmable clock as set forth in claim 8 wherein said processor means is responsive to said keyboard means to sequentially route the same data entered from said keyboard means to a plurality of memory locations in said first tier of said event memory wherein the addresses of the memory locations correspond to successive minutes of time.

10. A user-programmable clock as set forth in claim 9 wherein said processor means displays the time to the user which corresponds to the memory location receiving the said same data.

11. The user-programmable clock as set forth in claim 8 including:

a third tier of data in said event memory;

said means for selecting data stored in said first and second tiers also selecting data in said third tier; and said means for combining the selected data from said first and second tiers combining the selected data from said third tier with the selected data from said first and second tiers of said event memory.

12. The user-programmable clock as set forth in claim 8 wherein said second tier of data includes a plurality of locations in whose addresses correspond to days of the week whereby the combination of data from said first and second tiers identifies selected zones and schedule data for a particular day and time.

13. A user-programmable clock as set forth in claim 11 wherein said third tier of data identifies selected zones and schedules which are not to be executed by said means for executing regardless of the zone and schedule data in said first and second tiers.

14. A user-programmable clock as set forth in claim 8 wherein said processor means is responsive to said keyboard means to sequentially route unchanging zone and schedule data entered from said keyboard means to at least a portion of said plurality of memory locations in said first tier of said event memory wherein each location is identifiable with successive increments of time which together define a time period, said clock also including:

duration means responsive to said keyboard means for controlling the duration of the execution of the function in each of the selected zones with the maximum duration equal to said predetermined increment of time, whereby the time of executing a function in a zone will span said time period if the duration of execution for each event is equal to the increment of time corresponding to each location in the first tier of said event memory.

15. A user-programmable clock for executing events defined by functions executed at a particular time in selected zones and for selected schedules, said clock comprising in combination:

a processor means including timing means for providing timing data;

a keyboard means for signaling said processor means;

an event memory for receiving zone and schedule data in a plurality of locations from said keyboard means by way of said processor means wherein each location corresponds to an increment of time;

said processor means responsive to said keyboard means to sequentially route unchanging zone and schedule data entered from said keyboard means to at least a portion of said plurality of memory locations in said event memory wherein each location is identifiable with successive increments of time which together define a time period;

means for selecting the data stored in the one of said plurality of memory locations which corresponds to the timing data from said timing means;

means responsive to said selected data from said selecting means for executing a function in said selected zones and for said selected schedules; and duration means responsive to said keyboard means for controlling the duration of the function execution in each of the selected zones, with the maximum duration equal to a single time increment, whereby the event in a zone will span said time period if the duration of execution is equal to the increment of time corresponding to each location of event memory.

16. A user-programmable clock for executing events defined by functions executed at a particular time in selected zones and for selected schedules, said clock comprising in combination:

a processor means having at least first and second program modes;

a keyboard for entering data and control instructions to said processor means whereby said keyboard controls the programming mode of said processor;

an event memory having a plurality of event locations;

said processor means routing data entered from said keyboard to locations in said event memory;

said processor means receiving data from said keyboard when in said first programming mode for storage in locations of a first tier of said event memory wherein the locations of said first tier correspond to a time of day;

said processor receiving data from said keyboard when in said second programming mode for storage in locations of a second tier of said event memory wherein the locations of said second tier correspond to days of the week;

means for combining data entered into said memory from said first and second modes to create data representing an executable event; and means for executing the selected function indicated by the combined data at the appropriate day and time.

17. A user programmable clock as set forth in claim 16 wherein said first tier of event memory includes a plurality of event locations wherein each location corresponds to an increment of time such that all the event locations in said first tier represent a 24-hour time period.

18. A user-programmable clock as set forth in claim 17 wherein said second tier of event memory includes a plurality of event locations wherein each location corresponds to a day of the week.

19. A user-programmable clock as set forth in claim 16 wherein said processor means includes a third mode in which data from said keyboard is routed to a third tier of the event memory, said third tier data being combined with the data of said first and second tiers by said combining means in order to override the executable event represented by the combination of the data from said first and second tiers.

20. A user-programmable clock as set forth in claim 17 wherein said processor means is responsive to said keyboard to route unchanging data from said keyboard to a plurality of event locations in said first tier of said memory such that the same function is executed at successive time increments corresponding to the locations in said first tier which receive the unchanging data.

21. A user-programmable clock as set forth in claim 20 including, duration means responsive to data from said keyboard for controlling the length of an event associated with each location in said first tier of the event memory such that an event duration equal to the increment of time represented by each of said locations in said first tier causes a function to be executed for a time period equal to the sum of the time increments.

* * * * *